(12) United States Patent
Chamberland et al.

(10) Patent No.: US 11,853,159 B1
(45) Date of Patent: Dec. 26, 2023

(54) EDGE GRAPH MAPPING USING ANALOG INFORMATION WITH DYNAMICALLY UPDATED WEIGHTING FACTORS FOR A SURFACE GKP CODE

(71) Applicant: Amazon Technologies, Inc., Seattle, WA (US)

(72) Inventors: Christopher Chamberland, Pasadena, CA (US); Kyungjoo Noh, Pasadena, CA (US); Fernando Brandao, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 17/362,754

(22) Filed: Jun. 29, 2021

Related U.S. Application Data

(60) Provisional application No. 63/157,593, filed on Mar. 5, 2021.

(51) Int. Cl.
  *G06F 11/00* (2006.01)
  *G06F 11/10* (2006.01)
  *G06N 10/00* (2022.01)

(52) U.S. Cl.
  CPC ........... *G06F 11/104* (2013.01); *G06N 10/00* (2019.01)

(58) Field of Classification Search
  CPC .............................. G06F 11/104; G06N 10/00
  USPC .................................................. 714/799, 785
  See application file for complete search history.

(56) References Cited

U.S. PATENT DOCUMENTS

| | | | |
|---|---|---|---|
| 2019/0044543 A1* | 2/2019 | Chamberland | G06N 10/00 |
| 2021/0103847 A1* | 4/2021 | Akzam | H04B 10/70 |
| 2021/0103849 A1* | 4/2021 | Verdon-Akzam | G06N 10/00 |
| 2021/0125096 A1* | 4/2021 | Puri | G06N 10/00 |
| 2021/0232963 A1* | 7/2021 | Gimeno-Segovia | G06N 10/70 |
| 2022/0101173 A1* | 3/2022 | Alexander | G06N 10/00 |

OTHER PUBLICATIONS

J. Preskill, "Quantum Computing in the NISQ era and beyond", Institute for Quantum Information and Matter and Walter Burke Institute for Theoretical Physics, California Institute of Technology, Pasadena CA 91125, USA, 2018, pp. 1-20.

(Continued)

*Primary Examiner* — Albert Decady
*Assistant Examiner* — Osman M Alshack
(74) *Attorney, Agent, or Firm* — Alexander A. Knapp; Kowert, Hood, Munyon, Rankin & Goetzel, P.C.

(57) ABSTRACT

A fault tolerant quantum error correction protocol is implemented for a surface code comprising Gottesman Kitaev Preskill (GKP) qubits. Analog information is determined when measuring position or momentum shifts, wherein the analog information indicates a closeness of the shift to a decision boundary. The analog information is further used to determine confidence values for error corrected measurements from the GKP qubits of the surface code. These confidence values are used to dynamically determine edge weights in a matching graph used to decode syndrome measurements of the surface code, wherein the confidence values are obtained using a maximum-likelihood decoding protocol for two-qubit gates. Space-time correlated edges and other edges are included in the matching graph and weighted based at least in part on confidence values for qubits forming the respective edges.

20 Claims, 11 Drawing Sheets

(56) References Cited

OTHER PUBLICATIONS

D. Gottesman, "An Introduction to Quantum Error Correction and Fault-Tolerant Quantum Computation", Proceedings of Symposia in Applied Mathematics, arXiv e-prints, arXiv:0904.2557 [quant-ph]. 2009, pp. 1-46.
P. W. Shor, "Algorithms for quantum computation: discrete logarithms and factoring", IEEE, In Proceedings 35th Annual Symposium on Foundations of Computer Science (1994) pp. 1-14.
S. Lloyd, "Universal quantum simulators", Published by: American Association for the Advancement of Science, URL: http://www.jstor.org/stable/2899535, Source: Science, New Series, vol. 273, No. 5278 (Aug. 23, 1996), pp. 1073-1078.
A. G. Fowler, M. Mariantoni, J. M. Martinis, and A. N. Cleland, "Surface codes: Towards practical large-scale quantum computation", Phys. Rev. A 86, pp. 1-48 (2012).
J. Koch, T. M. Yu, J. Gambetta, A. A. Houck, D. I. Schuster, J. Majer, A. Blais, M. H. Devoret, S. M. Girvin, and R. J. Schoelkopf, "Charge-insensitive qubit design derived from the cooper pair box", Phys. Rev. A 76, 042319, pp. 1-19, (2007).
J. A. Schreier, A. A. Houck, J. Koch, D. I. Schuster, B. R. Johnson, J. M. Chow, J. M. Gambetta, J. Majer, L. Frunzio, M. H. Devoret, S. M. Girvin, and R. J. Schoelkopf, "Suppressing charge noise decoherence in superconducting charge qubits", Rapid Communications, Physical Review B 77, 180502(R), pp. 1-4, (2008).
L. Egan, D. M. Debroy, C. Noel, A. Risinger, D. Zhu, D. Biswas, M. Newman, M. Li, K. R. Brown, M. Cetina, and C. Monroe, "Fault-Tolerant Operation of a Quantum Error-Correction Code", arXiv e-prints, arXiv:2009.11482, (2020), arXiv:2009.11482 [quant-ph], pp. 1-23.
V. V. Albert, K. Noh, K. Duivenvoorden, D. J. Young, R. T. Brierley, P. Reinhold, C. Vuillot, L. Li, C. Shen, S. M. Girvin, B. M. Terhal, and L. Jiang, "Performance and structure of single-mode bosonic codes", Phys. Rev. A 97, 032346 pp. 1-30, (2018).
A. Joshi, K. Noh, and Y. Y. Gao, "Quantum information processing with bosonic qubits in circuit QED", Quantum Science and Technology, vol. 6, No. 3, pages, pp. 1-23 (2021).
W. Cai, Y. Ma, W.Wang, C. L. Zou, and L. Sun, "Bosonic quantum error correction codes in superconducting quantum circuits", arXiv e-prints, arXiv:2010.08699 (2020), arXiv:2010.08699 [quant-ph], pp. 1-23, 2020.
P. T. Cochrane, G. J. Milburn, and W. J. Munro, "Macroscopically distinct quantum-superposition states as a bosonic code for amplitude damping", CORE, Physical Review A, Volumer 59, No. 4, Apr. 1999, pp. 2631-2634.
H. Jeong and M. S. Kim, "Efficient quantum computation using coherent states", Phys. Rev. A, vol. 65, 042305, pp. 1-6, (Mar. 21, 2002).
M. Mirrahimi, Z. Leghtas, V. V. Albert, S. Touzard, R. J. Schoelkopf, L. Jiang, and M. H. Devoret, "Dynamically protected cat-qubits: a new paradigm for universal quantum computation", IOP Publishing Ltd and Deutsche Physikalische Gesellschaft, New Journal of Physics vol. 16, 045014, pp. 1-31, (2014).
Z. Leghtas, et al., "Confining the state of light to a quantum manifold by engineered two-photon loss", Science vol. 347, Issue 6624, pp. 853-857, (2015) (downloaded from arXiv:1412.4633 Dec. 15, 2014).
R. Lescanne, et al, "Exponential suppression of bit-flips in a qubit encoded in an oscillator", Nature Physics 16, pp. 509-513 (2020).
J. Guillaud et al., "Repetition Cat Qubits for Fault-Tolerant Quantum Computation", Phys. Rev. X 9, 041053 (Dec. 12, 2019) arXiv:1904.09474, pp. 1-23.
S. Puri, et al., "Bias-preserving gates with stabilized cat qubits", Science Advances vol. 6, No. 34, eaay5901, DOI 10.1126/sciadv.aay5901 (Aug. 21, 2020), pp. 1-15.
J. Guillaud et al, "Error Rates and Resource Overheads of Repetition Cat Qubits", Phys. Rev. A 103, 042413—Published Apr. 13, 2021, arXiv e-prints, arXiv:2009.10756 (2020), arXiv:2009.10756 [quant-ph], pp. 1-17.

C. Chamberland, et al., "Building a fault-tolerant quantum computer using concatenated cat codes", arXiv e-prints, arXiv:2012.04108 (2020), arXiv:2012.04108 [quant-ph], pp. 1-118.
P. Aliferis and J. Preskill, "Fault-tolerant quantum computation against biased noise", Phys. Rev. A 78, 052331—Published Nov. 19, 2008, pp. 1-9.
D. Gottesman, et al., "Encoding a qubit in an oscillator", Phys. Rev. A, vol. 64, 012310—Published Jun. 11, 2001, pp. 1-21.
C. Fluhmann, et al., "Encoding a qubit in a trapped-ion mechanical oscillator", preprint at arxiv.org/abs/1807.01033 (pp. 1-11), Nature 566, pp. 513-517, (Feb. 27, 2019).
C. Fluhmann and J. P. Home, "Direct Characteristic-Function Tomography of Quantum States of the Trapped-Ion Motional Oscillator", Phys. Rev. Lett. 125, 043602, Jul. 1, 2020, preprint at https://arxiv.org/pdf/1907.06478.pdf (2019), pp. 1-12.
B. de Neeve, et al., "Error correction of a logical grid state qubit by dissipative pumping", arXiv e-prints, arXiv:2010.09681 (2020), arXiv:2010.09681 [quant-ph], pp. 1-13.
P. Campagne-Ibarcq, et al., "Quantum error correction of a qubit encoded in grid states of an oscillator", Nature vol. 584, pp. 368-373, (Aug. 20, 2020).
K. Fukui, A. Tomita, and A. Okamoto, "Analog Quantum Error Correction with Encoding a Qubit into an Oscillator", Phys. Rev. Lett. 119, 180507 (2017), arxiv e-prints, arxiv.org/abs/1706.03011v3, pp. 1-6.
K. Fukui, et al., "High-Threshold Fault-Tolerant Quantum Computation with Analog Quantum Error Correction", Phys. Rev. X 8, 021054, (2018), pp. 1-12.
C. Vuillot, et al., "Quantum error correction with the toric gottesman-kitaev-preskill code", ©2019 American Physical Society, Physical Review A 99, 032344, (2019), pp. 1-28.
K. Noh and C. Chamberland, "Fault-tolerant bosonic quantum error correction with the surface-gottesmankitaev-preskill code", Physical Review A 101, 012316 (2020), arXiv e-prints, https://arxiv.org/pdf/1908.03579.pdf, pp. 1-23.
H. Yamasaki, et al., "Polylog-overhead highly fault-tolerant measurement-based quantum computation: allGaussian implementation with Gottesman-Kitaev-Preskill code", arXiv e-prints, arXiv:2006.05416 (2020), arXiv:2006.05416 [quant-ph], pp. 1-55.
M. V. Larsen, et al., "A fault-tolerant continuous-variable measurement-based quantum computation architecture", arXiv e-prints, arXiv:2101.03014 (2021), arXiv:2101.03014 [quant-ph], pp. 1-16.
J. E. Bourassa, et al., "Blueprint for a Scalable Photonic Fault-Tolerant Quantum Computer", Quantum vol. 5, p. 392 (2021), arXiv e-prints, arXiv:2010.02905v2 [quant-ph] Feb. 2, 2021, pp. 1-38.
B. Royer, S. Singh, and S. M. Girvin, "Stabilization of Finite-Energy Gottesman-Kitaev-Preskill States", Phys. Rev. Lett. 125, 260509 (2020), arXiv e-prints, arXiv:2009.07941v1 [quant-ph] Sep. 16, 2020, pp. 1-33.
S. Puri, et al., "Stabilized Cat in a Driven Nonlinear Cavity: A Fault-Tolerant Error Syndrome Detector", Phys. Rev. X 9, 041009 (2019), arXiv e-prints, arXiv: 1807.09334v1 [quant-ph] Jul. 24, 2018, pp. 1-22.
B. W. Walshe, et al., "Continuous-variable gate teleportation and bosonic-code error correction", Phys. Rev. A 102, 062411 (2020), arXiv e-prints, arXiv:2008.12791v3 [quant-ph] Dec. 18, 2020, pp. 1-21.
L. Hanggli, et al., "Enhanced noise resilience of the surface-GKP code via designed bias", Phys. Rev. A 102, 052408 (2020), arXiv e-prints, arXiv:2004.00541v1 [quant-ph] Apr. 1, 2020, pp. 1-31.
Y. Y. Gao, et al., "Programmable interference between two microwave quantum memories", American Physical Sociey. Phys. Rev. X 8, 021073 (2018), pp. 1-7.
Y. Zhang, et al., "Engineering bilinear mode coupling in circuit QED: Theory and experiment", @2019 American Physical Society, Phys. Rev. A 99, 012314 (2019), pp. 1-39.
Y. Y. Gao, et al., "Entanglement of bosonic modes through an engineered exchange interaction", Nature, vol. 566, pp. 509-512 (2019).
K. Duivenvoorden, B. M. Terhal, and D.Weigand, "Singlemode displacement sensor", Phys. Rev. A 95, 012305 (2017), arXiv e-prints, arXiv:1603.02242v4 [quant-ph] Oct. 25, 2016, pp. 1-16.

(56) References Cited

OTHER PUBLICATIONS

K. Noh, S. M. Girvin, and L. Jiang, "Encoding an Oscillator into Many Oscillators", Phys. Rev. Lett. 125, 080503, (2020), arXiv e-prints, arXiv:1903.12615v1 [quant-ph] Mar. 29, 2019, pp. 1-16.
L. Hanggli and R. Koenig, "Oscillator-to-oscillator codes do not have a threshold", arXiv e-prints, arXiv:2102.05545 (2021), arXiv:2102.05545 [quant-ph], pp. 1-33.
E. Knill, "Quantum computing with realistically noisy devices", Nature Publication Group, vol. 434, pp. 39-44 (2005).
D. P. DiVincenzo and P. Aliferis, "Effective Fault-Tolerant Quantum Computation with Slow Measurements", Phys. Rev. Lett. 98, 020501 (2007), arXiv e-print, arXiv:quant-ph/0607047 v2 Aug. 3, 2006, pp. 1-10.
B. M. Terhal, "Quantum Error Correction for Quantum Memories", Rev. Mod. Phys. 87, 307 (2015), arXiv e-print, arXiv:1302.3428v2 [quant-ph], pp. 1-37.
C. Chamberland, P. Iyer, and D. Poulin, "Fault-tolerant quantum computing in the Pauli or Clifford frame with slow error diagnostics", Quantum 2, 43 (2018), arXiv e-print, arXiv:1704.06662v2, pp. 1-11, 2017.
S. Glancy and E. Knill, "Error analysis for encoding a qubit in an oscillator", Physical Review A 73, 012325 (2006), pp. 1-5.
Y. Tomita and K. M. Svore, "Low-distance surface codes under realistic quantum noise", Phys. Rev. A 90, 062320 (2014), arXiv e-print, arXiv: 1404.3747v1 [quant-ph] Apr. 14, 2014, pp. 1-14.
A. G. Fowler, et al., "Topological code autotune", Phys. Rev. X 2, 041003 (2012), arXiv e-print, arXiv:1202.6111v1 [quant-ph] Feb. 28, 2012, pp. 1-10.
J. Edmonds, "Paths, trees, and flowers", Canadian Journal of mathematics 17, pp. 449-467, (1965).
B. M. Terhal and D. Weigand, "Encoding a Qubit into a Cavity Mode in Circuit-QED using Phase Estimation", Phys. Rev. A 93, 012315 (2016), arXiv e-print, arXiv: 1506.05033, pp. 1-24.
Y. Shi, C. Chamberland, and A. Cross, "Fault-tolerant preparation of approximate GKP states", New Journal of Physics 21, 093007 (2019), arXiv e-print, arXiv:1905.00903v2 [quant-ph] Aug. 20, 2019, pp. 1-30.
B. M. Terhal, J. Conrad, and C. Vuillot, "Towards Scalable Bosonic Quantum Error Correction", Quantum Science and Technology vol. 5, No. 4, 043001 (2020), arXiv e-print, arXiv:2002.11008v3 [quant-ph] Jun. 1, 2020, pp. 1-59.
O. Vy, X. Wang, and K. Jacobs, "Error-transparent evolution: the ability of multi-body interactions to bypass decoherence", New Journal of Physics vol. 15, 053002 (2013), pp. 1-14.
E. Kapit, "Error-transparent quantum gates for small logical qubit architectures", Phys. Rev. Lett. 120, 050503 (2018), arXiv e-print, arXiv: 1703.09762v1 [quant-ph], pp. 1-8.
S. Rosenblum, P. Reinhold, M. Mirrahimi, L. Jiang, L. Frunzio, and R. J. Schoelkopf, "Fault-tolerant detection of a quantum error", vol. 361, Issue 6399, pp. 266-270 (2018).
P. Reinhold, S. Rosenblum, W.-L. Ma, L. Frunzio, L. Jiang, and R. J. Schoelkopf, "Error-corrected gates on an encoded qubit", Nature Physics 16, 822 (2020), arXiv e-print, arXiv:1907.12327v1 [quant-ph], pp. 1-15.
W.-L. Ma, M. Zhang, Y. Wong, K. Noh, S. Rosenblum, P. Reinhold, R. J. Schoelkopf, and L. Jiang, "Path-Independent Quantum Gates with Noisy Ancilla", Phys. Rev. Lett. 125, 110503 (2020), arXiv e-print, arXiv:1911.12240v3 [quant-ph] Aug. 9, 2020, pp. 1-21.
G. Pantaleoni, B. Q. Baragiola, and N. C. Menicucci, "Modular bosonic subsystem codes", Phys. Rev. Lett. 125, 040501 (2020), arXiv e-print, arXiv:1907.08210v3 [quant-ph] Jul. 20, 2020, pp. 1-6.
I. Tzitrin, J. E. Bourassa, N. C. Menicucci, and K. K. Sabapathy, "Progress towards practical qubit computation using approximate Gottesman-Kitaev-Preskill codes", Phys. Rev. A 101, 032315 (2020), arXiv e-print, arXiv:1910.03673v2 [quant-ph] Mar. 16, 2020, pp. 1-35.
K. H. Wan, A. Neville, and S. Kolthammer, "Memory-assisted decoder for approximate Gottesman-Kitaev-Preskill codes", Phys. Rev. Research 2, 043280 (2020), arXiv e-print, arXiv: 1912.00829v3 [quant-ph] Nov. 24, 2020, pp. 1-13.
G. Pantaleoni, B. Q. Baragiola, and N. C. Menicucci, "Subsystem analysis of continuous-variable resource states", arXiv e-prints, arXiv:2102.10500 (2021), arXiv:2102.10500 [quant-ph], pp. 1-22.
D. Gottesman, "The Heisenberg Representation of Quantum Computers", arXiv e-prints, quant-ph/9807006 (1998), arXiv:quant-ph/9807006 [quant-ph], pp. 1-20.
S. Aaronson and D. Gottesman, "Improved Simulation of Stabilizer Circuits", Phys. Rev. A 70, 052328 (2004), pp. 1-15.
S. Bravyi, et al., "Efficient algorithms for maximum likelihood decoding in the surface code", Phys. Rev. A 90, 032326 (2014), arXiv e-print, arXiv: 1405.4883v1 [quant-ph] May 19, 2014, pp. 1-18.
C. T. Chubb and S. T. Flammia, "Statistical mechanical models for quantum codes with correlated noise", arXiv e- prints, arXiv:1809.10704 (2018), arXiv:1809.10704 [quant-ph], pp. 1-19.
N. Delfosse and N. H. Nickerson, "Almost-linear time decoding algorithm for topological codes", arXiv e-prints, arXiv: 1709.06218 (2017), arXiv:1709.06218 [quant-ph], pp. 1-10.
M. Newman, L. A. de Castro, and K. R. Brown, "Generating Fault-Tolerant Cluster States from Crystal Structures", Quantum vol. 4, p. 295 (2020), Eprint: arXiv: 1909.11817v2, pp. 1-37.
S. Huang, M. Newman, and K. R. Brown, "Fault-tolerant weighted union-find decoding on the toric code", Phys. Rev. A 102, 012419 (2020), e-print arXiv:2004.04693v1 [quant-ph] Apr. 9, 2020, pp. 1-6.
S. Bravyi and A. Kitaev, "Universal quantum computation with ideal cliord gates and noisy ancillas", ©2005 The American Physical Society, Physical Review A 71, 022316 s2005), pp. 1-14.
C. Chamberland and A. W. Cross, "Fault-tolerant magic state preparation with ag qubits", Quantum, vol. 3, p. 143, (2019), Eprint: arXiv:1811.00566v2, pp. 1-26.
C. Chamberland and K. Noh, "Very low overhead faulttolerant magic state preparation using redundant ancilla encoding and ag qubits", npj Quantum Information 6, Article No. 91 (2020), e-print: arXiv:2003.03049v1 [quant-ph] Mar. 6, 2020, pp. 1-27.
R. Chao and B. W. Reichardt, "Quantum Error Correction with Only Two Extra Qubits", Phys. Rev. Lett. 121, 050502 (2018), e-print arXiv:1705.02329v1 [quant-ph] May 5, 2017, pp. 1-9.
R. Chao and B. W. Reichardt, "Fault-tolerant quantum computation with few qubits", www.nature.com/mpjqi, npj Quantum Information 4, 42 (2018), pp. 1-9.
C. Chamberland and M. E. Beverland, "Flag fault-tolerant error correction with arbitrary distance codes", Quantum 2, 53 (2018), e-print arXiv: 1708.02246v3 [quant-ph] Jan. 31, 2018, pp. 1-29.
T. Tansuwannont, C. Chamberland, and D. Leung, Flag fault-tolerant error correction, measurement, and quantum computation for cyclic Calderbank-Shor-Steane codes, Phys. Rev. A 101, 012342 (2020), e-print arXiv: 1803.09758v3 [quant-ph] Jul. 22, 2019, pp. 1-17.
C. Chamberland, et al., "Topological and Subsystem Codes on Low-Degree Graphs with Flag Qubits", Phys. Rev. X 10, 011022 (2020), e-print: arXiv:1907.09528v2 [quant-ph], pp. 1-21.
C. Chamberland, A. Kubica, T. J. Yoder, and G. Zhu, "Triangular color codes on trivalent graphs with flag qubits", New Journal of Physics 22, 023019 (2020), pp. 1-24.
B. W. Reichardt, "Fault-tolerant quantum error correction for steane's seven-qubit color code with few or no extra qubits", Quantum Science and Technology 6, 015007 (2020), e-print: arXiv: 1804.06995v1 [quant-ph], pp. 1-11.
R. Chao and B. W. Reichardt, "Flag fault-tolerant error correction for any stabilizer code", Published by the American Physical Society, PRX Quantum 1, 010302 (2020), pp. 1-6.
S. Touzard, et al., "Gated Conditional Displacement Readout of Superconducting Qubits", Phys. Rev. Lett. 122, 080502 (2019), e-print: arXiv:1809.06964v1 [quant-ph], pp. 1-17.
N. E. Frattini, et al., "3-wave mixing josephson dipole element", Applied Physics Letters 110, 222603 (2017), https://doi.org/10.1063/1.4984142, e-print: arXiv:1702.00869v3 [cond-mat.supr-con] Jun. 1, 2017, pp. 1-5.

(56) References Cited

OTHER PUBLICATIONS

D. S. Wang, A. G. Fowler, and L. C. L. Hollenberg, "Surface code quantum computing with error rates over 1%", Physical Review A 83, 020302 (2011).
U.S. Appl. No. 17/362,750, filed Jun. 29, 2021, Kyungjoo Noh, et al., Specification pp. 1-43, Drawing pp. 1-11.
U.S. Appl. No. 17/362,761, filed Jun. 29, 2021, Kyungjoo Noh, et al., Specification pp. 1-40, Drawing pp. 1-11.

* cited by examiner

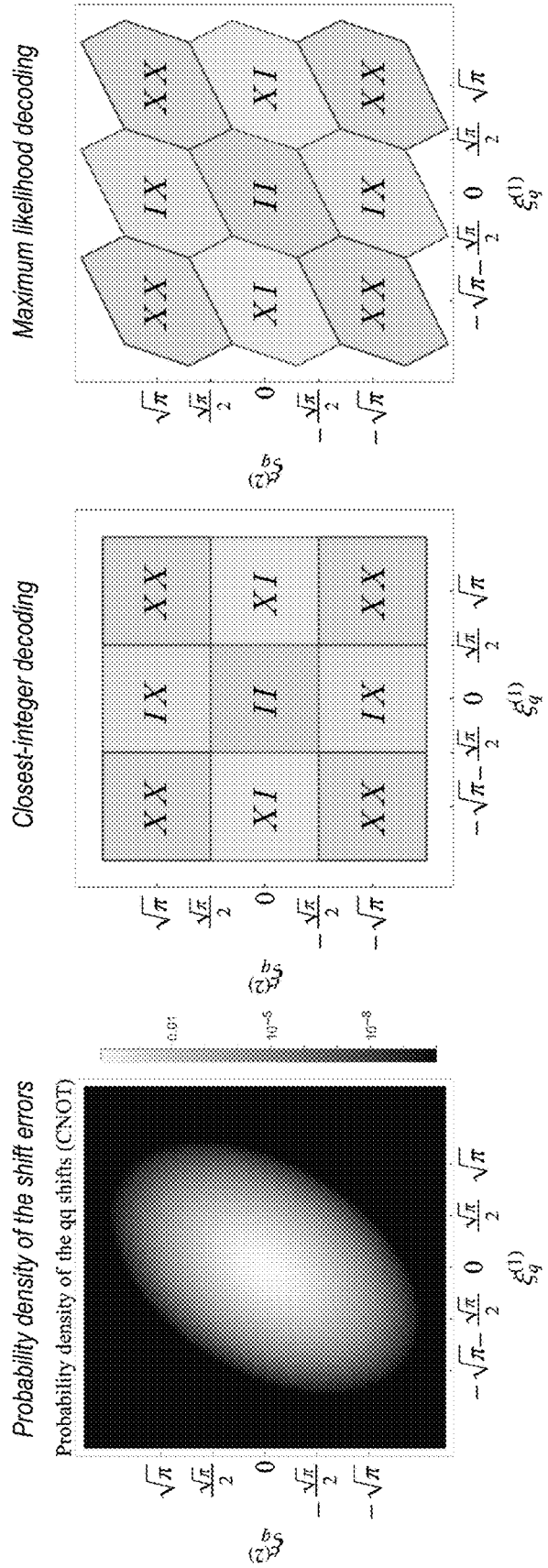
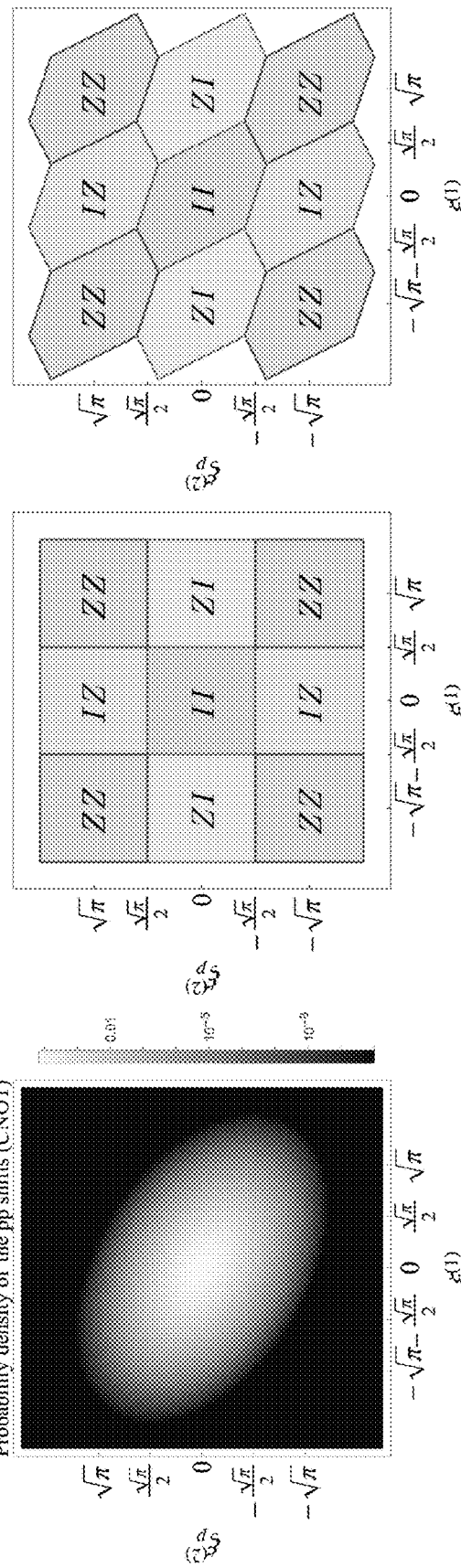
FIG. 5A  FIG. 5B  FIG. 5C

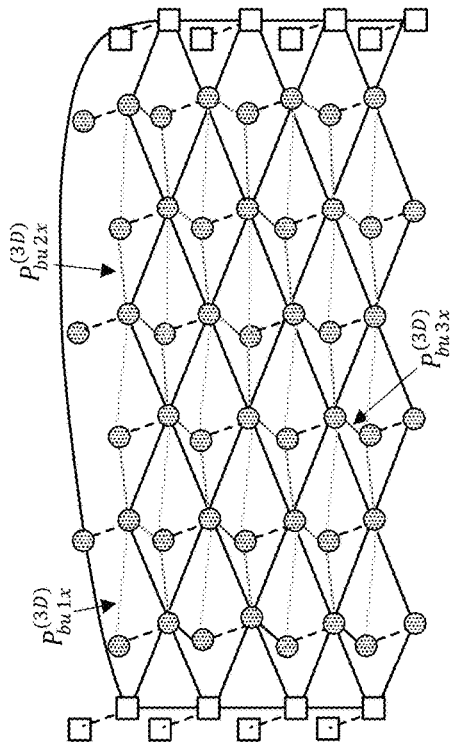
FIG. 6A
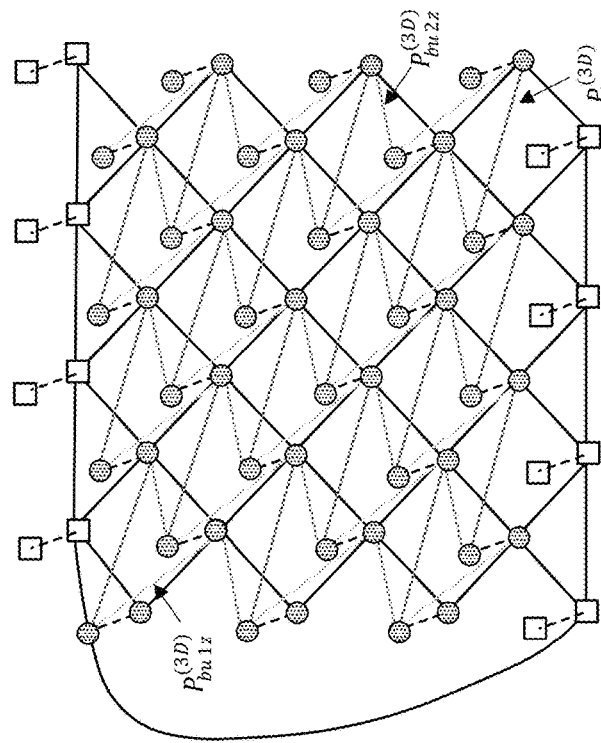
FIG. 6B
FIG. 6C
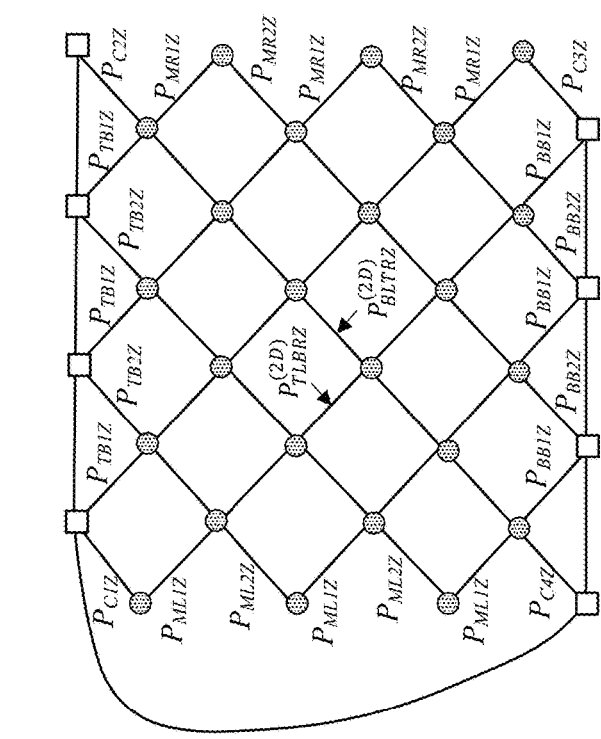
FIG. 6D

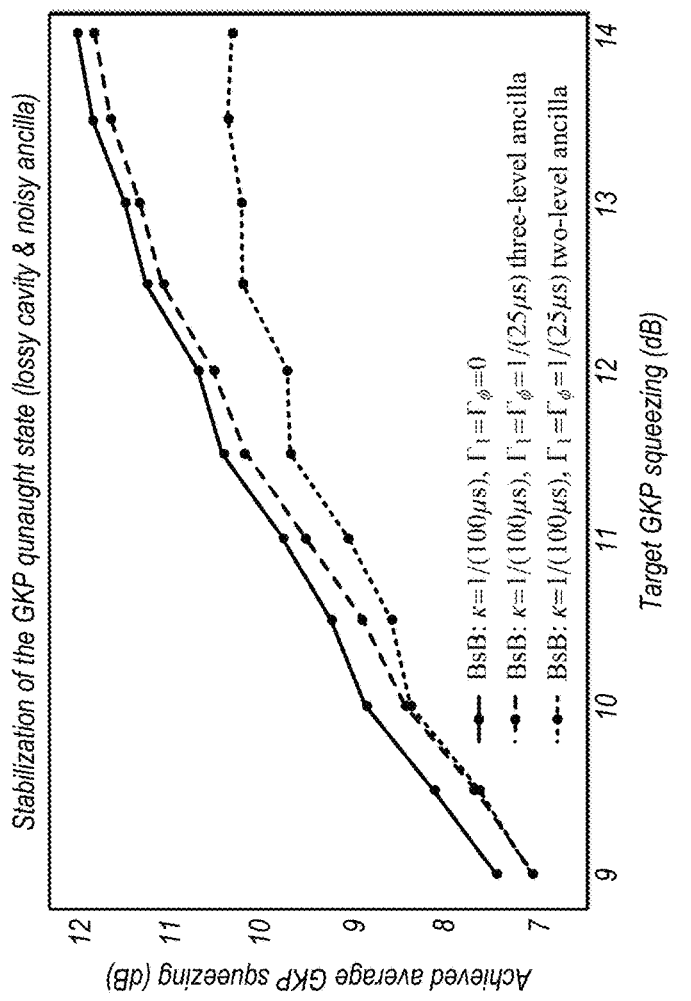
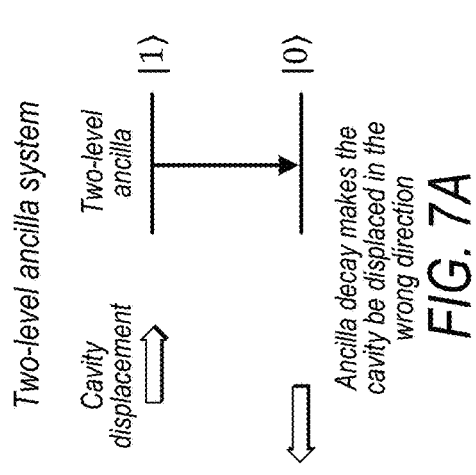
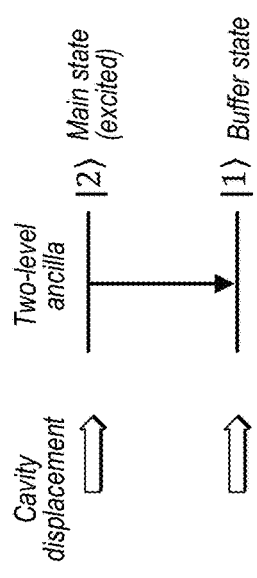
FIG. 7A
FIG. 7B
FIG. 7C

EDGE GRAPH MAPPING USING ANALOG INFORMATION WITH DYNAMICALLY UPDATED WEIGHTING FACTORS FOR A SURFACE GKP CODE

This application claims benefit of priority to U.S. Provisional Application Ser. No. 63/157,593, entitled "Fault-Tolerant Quantum Error Correction with the Surface GKP Code", filed Mar. 5, 2021, and which is incorporated herein by reference in its entirety.

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g. the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers whose squares sum up to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g. a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a set of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, availability, etc. may vary across quantum computing technologies.

For some types of quantum computations, such as fault tolerant computation of large scale quantum algorithms, overhead costs for performing such quantum computations may be high. For example for types of quantum gates that are not naturally fault tolerant, the quantum gates may be encoded in error correcting code, such as a surface code. However this may add to the overhead number of qubits required to implement the large scale quantum algorithms. Also, performing successive quantum gates, measurement of quantum circuits, etc. may introduce probabilities of errors in the quantum circuits and/or measured results of the quantum circuits.

BRIEF DESCRIPTION OF THE DRAWINGS

FIG. 5A illustrates probability densities of shift errors resulting from correlations between qubits operated on by a logical gate, wherein the correlations and/or probability densities may be used to determine maximum likelihood decision boundaries, according to some embodiments.

FIG. 5B illustrates decision boundaries determined for a closest integer decoding, according to some embodiments.

FIG. 5C illustrates decision boundaries determined for a maximum likelihood decoding, according to some embodiments.

FIG. 6A illustrates a two-dimensional matching graph for X-type stabilizer measurement outcomes of the surface code for a surface code of size $d_x=d_z=7$, wherein the different labels indicate different types of edges used in the decoding protocol, according to some embodiments.

FIG. 6B illustrates the two-dimensional matching graph as shown in FIG. 6A with vertical and space-time correlated edges connecting between adjacent two-dimensional layers, according to some embodiments.

FIG. 6C illustrates a two-dimensional matching graph for Z-type stabilizer measurement outcomes of the surface code for a surface code of size $d_x=d_z=7$, wherein the different labels indicate different types of edges used in the decoding protocol, according to some embodiments.

FIG. 6D illustrates the two-dimensional matching graph as shown in FIG. 6C with vertical and space-time correlated edges connecting between adjacent two-dimensional layers, according to some embodiments.

FIG. 7A illustrates a two-level ancilla system (e.g., lowest two levels of a transmon), according to some embodiments.

FIG. 7B illustrates a three-level ancilla system (e.g., lowest three levels of a transmon), according to some embodiments.

FIG. 7C illustrates achieved squeezing verses targeted squeezing for different types of ancilla systems (e.g., transmon), according to some embodiments.

Figure 1:
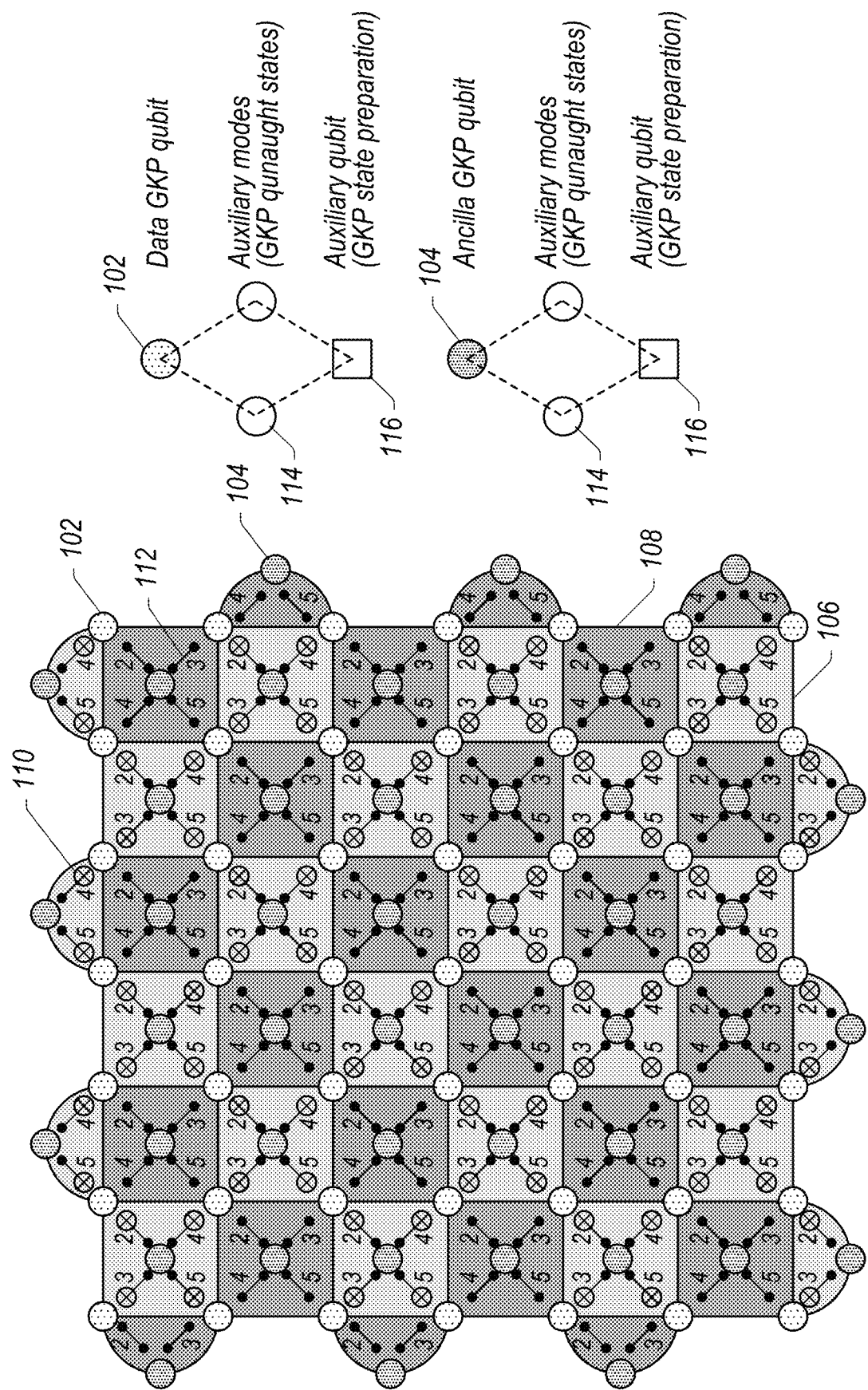
FIG. 1 illustrates an example surface code comprising Gottesman Kitaev Preskill (GKP) qubits, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing a quantum error correction with a surface code comprising Gottesman Kitaev Preskill (GKP) qubits that efficiently uses resources, such as qubits.

Fault tolerant quantum error correction techniques are needed for executing quantum algorithms intractable by classical computers, such as integer factorization and the simulation of real-time dynamics of large quantum systems. One approach towards fault-tolerant quantum computing is to implement a surface code (or its variants) using bare qubits such as transmons or internal states of trapped ions. However, bosonic qubits (error corrected via bosonic quantum error correction) provide unique advantages that are not available to bare qubits. For example, two component cat codes (consisting of two coherent states $|\pm\alpha\rangle$) naturally realize noise-biased qubits whose bit-flip error rate is exponentially suppressed in the size of the code $|\alpha|^2$, whereas the phase-flip error rate increases only linearly in $|\alpha|^2$. Also, a CNOT gate between these two noise-biased cat qubits can be performed in a bias-preserving way, e.g., high noise bias (towards phase-flip errors) can be maintained during the entire execution of the CNOT gate through a suitably designed control scheme. Additionally, a bias-preserving CNOT gate is not possible with strictly two-dimensional bare qubits. However, a unique noise-bias feature of bosonic cat qubits can be utilized to significantly reduce the required resource overheads for implementing fault-tolerant quantum computation.

For example, Gottesman Kitaev Preskill (GKP) qubits are another example of bosonic qubits which enjoy unique advantages unavailable to bare two-dimensional qubits. For example if GKP qubits are used to implement a next-level error-correcting code (e.g., the surface code), extra analog information gathered from GKP error correction can be used to inform which GKP qubits are more likely to have had an error. Thus, by incorporating the extra analog information and providing it to the decoder of a next level code (such as the surface code), the performance of the next level error correction code (e.g. the surface code comprising GKP qubits) can be boosted.

Surface Code Comprising GKP Qubits

In some embodiments, a surface-GKP code may comprise concatenation of the GKP code with the surface code, for example as shown in FIG. 1, wherein the surface code comprises data GKP qubits and ancilla GKP qubits. Note as shown in the right hand portion of FIG. 1, each of the GKP data qubits and ancilla qubits may have associated auxiliary modes (e.g. qunaught states) that are prepared using an auxiliary qubit associated with the GKP qubit (e.g. data or ancilla GKP qubit).

In some embodiments, GKP error correction is performed four times for each surface code stabilizer measurement.

A surface code lattice for a distance $d_x=d_z=7$ surface code (encoding one logical qubit) is illustrated in FIG. 1. Lightly colored vertices 102 correspond to data qubits where the logical information is stored, and more darkly colored vertices 104 correspond to ancilla qubits used to measure the surface code stabilizers. The X-type stabilizers are represented by lightly colored-plaquettes 106 and detect Z errors whereas Z-type stabilizers are represented by more darkly colored plaquettes 108 and detect X errors. The logical $\overline{X}$ operator has minimum support on $d_x$ qubits along each column of the lattice. The logical $\overline{Z}$ operator has minimum support on $d_z$ qubits along each row of the lattice. It can be assumed that the data qubits are encoded in a square-lattice GKP qubit (square and rectangular-lattice GKP qubits are further discussed below). In some embodiments, noise-biased rectangular-lattice GKP qubits (e.g., $0.8 \leq \lambda \leq 1.2$) are used for the ancilla qubits. All ancilla qubits 104 in the lattice of FIG. 1 are prepared in the $|+_\lambda\rangle$ state and measured in the X basis via a momentum homodyne measurement. The numbers adjacent to the CNOT gates (110) and CZ gates (112) indicate the time step at which such gates are applied. In some embodiments, a two-qubit gate scheduling is used.

In some embodiments, (teleportation-based) GKP error correction is applied at the end of each CNOT or CZ gate. That is, each CNOT (or CZ) gate is an error-corrected logical CNOT (or CZ) gate between two GKP qubits as described in more detail below with regard to teleportation-based GKP error correction. Also importantly, since GKP error correction is performed after every two-qubit gate, extra analog information is gathered from the GKP error correction for each two-qubit gate. This analog information can then be used to compute conditional probabilities of Pauli error rates for each error-corrected CNOT or CZ gate between two GKP qubits. The same applies to the ancilla state preparation, idling, and measurements as well. Note that due to the need to implement the GKP error correction to all GKP qubits, each GKP qubit may be assisted by two auxiliary modes (white vertices 114 in FIG. 1) that host two GKP qunaught states and one auxiliary qubit (white square 116 in FIG. 1) used to prepare the GKP qunaught states. In some embodiments, maximum likelihood decoding (as further described below, for example in regard to FIG. 5C) is used instead of the simple closest-integer decoding to correct for shift errors in error-corrected CNOT and CZ gates between two GKP qubits.

In order to ensure a fault-tolerant error correction protocol, measurements of the stabilizers may be repeated at least d=max {$d_x$, $d_z$} times. Errors are then corrected using a Minimum Weight Perfect Matching (MWPM) decoder applied to three-dimensional matching graphs (for example as shown in FIGS. 6A-6D) with weighted edges which incorporate the conditional probabilities of the GKP error correction for the entire syndrome history. For example, the matching graphs for X and Z-type stabilizers in FIGS. 6A-6D show how edge weights can be computed dynamically using analog information from the GKP error correction, with matching graphs for X-type stabilizers shown in FIGS. 6A-6B and Z-type stabilizers shown in FIGS. 6C-6D. It may be noted that when using the analog information for computing edge weights in the matching graphs, at every time step and in each syndrome measurement round, every fault location (which includes two-qubit gates, idle, state-preparation and ancilla measurements) can have different conditional probabilities associated with a particular Pauli error at the given location. As such, edge weights are not precomputed and are instead updated dynamically.

In some embodiments, using the analog information in the GKP decoding scheme results in smaller logical failure rates by several orders of magnitude (in comparison to a case where analog information is not used for decoding). For instance, for d=9 and $\sigma_{gkp}^{(dB)}$=11 dB, without the analog information the logical failure rate is found to be $6.72\times10^{-3}$ compared to $1.94\times10^{-6}$ when using the analog information, an improvement by a factor of ~3461. Such a large improvement is possible since all edge weights of the matching graphs used by the minimum weight perfect matching (MWPM) decoder are determined based on the conditional probabilities of all types of errors in the full history of syndrome measurement rounds given the extra analog information. If GKP qubits are sufficiently squeezed (e.g. $\sigma_{gkp}^{(dB)} \gtrsim 9$ dB), a Pauli error on GKP qubits occurs due to a shift that is barely larger than the largest correctable shift (e.g., $\sqrt{\pi}/2$) in the case of an idling square-lattice GKP qubit). Hence, most Pauli errors on GKP qubits occur near the decision boundary of a GKP error correction and hence come with a high conditional probability because decisions made near the decision boundary are less reliable than the ones made deep inside the decision boundary.

For instance, in the case of the distance-three surface code, there are many cases where two faults happen during the three syndrome measurement rounds. These two faults come with high conditional probabilities as they are caused by shifts close to the decision boundary. If this extra analog information (e.g. high conditional probabilities) are not taken into account, the MWPM decoder will choose a wrong path consistent with the syndrome history when pairing highlighted vertices. The correction will then result in a logical Pauli error in the surface-GKP code. However, since the two faults that did happen are likely to have high conditional probabilities, the paths correcting the resulting errors are favored by the MWPM decoder when the analog information is incorporated in the decoding protocol. Thus, even though the distance of the surface code is only three (and hence can only correct at most one fault in the standard surface code setting with bare two-dimensional qubits), many two-fault events are correctable in the surface-GKP code setting with the help of the extra analog information.

It is also pointed out that, the opposite can also be true in principle. That is, there may be cases where only a single fault occurred but two other candidate fault locations have much higher conditional probabilities despite the fact that no errors were introduced at these other two locations (i.e., false alarms). In this case, the MWPM decoder favors edges of two data qubits not afflicted by an error (due to the large conditional probabilities). The applied correction would then result in a logical Pauli error for the surface-GKP code even though only one fault actually happened. Such possibilities might seem problematic from a fault-tolerance perspective. However, such events occur with very small probability (smaller than the computed logical failure rates) and the benefit of using the extra analog information strongly outweighs the side effects due to false alarms. In some embodiments, a threshold $\sigma_{gkp}(dB) \approx 9.9$ dB is used.

Rectangular-lattice GKP code states are stabilized by two commuting displacement operators $$\hat{S}_{q,\lambda} = \exp\left[i\frac{2\sqrt{\pi}}{\lambda}\hat{q}\right],$$

$$\hat{S}_{p,\lambda} = \exp[i2\sqrt{\pi}\lambda\hat{p}].$$

Note that the $\lambda=1$ case corresponds to the square lattice GKP code and as will be made clear shortly, the parameter $\lambda$ determines the aspect ratio of the underlying rectangular lattice. The logical Pauli operators are given by:

$$|0_\lambda\rangle \propto \sum_{n\in\mathbb{Z}} |\hat{q} = 2n\sqrt{\pi}\lambda\rangle$$

$$|1_\lambda\rangle \propto \sum_{n\in\mathbb{Z}} |\hat{q} = (2n+1)\sqrt{\pi}\lambda\rangle.$$

Also, the logical states in the complimentary basis (eigenstates of $\hat{X}_\lambda$) are given by:

$$|+_\lambda\rangle \propto \sum_{n\in\mathbb{Z}} |\hat{p} = 2n\sqrt{\pi}\lambda\rangle$$

$$|-_\lambda\rangle \propto \sum_{n\in\mathbb{Z}} |\hat{p} = (2n+1)\sqrt{\pi}\lambda\rangle.$$

Note that the position and momentum quadratures of the logical states sit on a rectangular lattice {$n_q\sqrt{\pi}\lambda$, $n_p\sqrt{\pi}/n_q$, $n_p \in \mathbb{Z}$}. Thus, compared to the square-lattice case (i.e., $\lambda=1$), the spacing in the position quadrature is elongated by a factor of $\lambda$ and the spacing in the momentum quadrature is contracted by the same factor. In terms of the error-correcting capability, this means that the rectangular-lattice GKP code can correct any small shift error $\exp[i(\xi_p\hat{q}-\xi_q\hat{p})]$ with $$|\xi_q| < \frac{\sqrt{\pi}\lambda}{2}, |\xi_p| < \frac{\sqrt{\pi}}{2\lambda}.$$

As a result, choosing $\lambda>1$ and assuming that noise is symmetric in both the position and the momentum quadratures (which is typically the case), the rectangular-lattice GKP code has a higher chance of having a logical Z error than a logical X error. The opposite is true for $\lambda<1$.

Regardless of the underlying lattice structure of the GKP code, logical Clifford operations of the GKP code can be performed by using a Gaussian operation (or a quadratic Hamiltonian in the quadrature operators). The most relevant Clifford operations to the implementation of the surface code are the CNOT and the CZ gates. In the surface code architecture described herein, a hybrid code is considered where the ancilla qubits of the surface code are encoded in a rectangular-lattice GKP code but the data qubits are encoded in the square-lattice GKP code. Thus, it can be assumed that the control qubit of the CNOT gate is a rectangular-lattice GKP qubit with $0.8 \leq \lambda \leq 1.2$ and the target qubit is a square-lattice GKP qubit with $\lambda=1$. Such a CNOT gate can be implemented by using a rescaled SUM gate (or a qp coupling)

$$CNOT_{j \to k} = \exp\left[-\frac{i}{\lambda}\hat{q}_j \hat{p}_k\right],$$

where j is the control qubit and k is the target qubit. Similarly, the CZ gate between a rectangular-lattice GKP qubit and a square-lattice GKP qubit can be realized via a qq coupling:

$$CZ_{j,k} = \exp\left[\frac{i}{\lambda}\hat{q}_j \hat{q}_k\right],$$

where the qubit j is encoded in a rectangular-lattice GKP code and the qubit k is encoded in the square-lattice GKP qubit.

Additionally, the Z-basis measurement (distinguishing $|0_\lambda\rangle$ from $|1_\lambda\rangle$) can be performed by a position homodyne measurement. More specifically, if the position homodyne measurement outcome is in the range $\{q_m|(n_q-\frac{1}{2})\sqrt{\pi\lambda} < q_m < (n_q+\frac{1}{2})\overline{\pi}\lambda\}$ for an even (odd) $n_q$, it can be inferred that the state is in $|0_\lambda\rangle$ ($|1_\lambda\rangle$). Similarly, the X-basis measurement can be done by a momentum homodyne measurement: if the measurement outcome $p_m$ is in the range $\{p_m|(n_p-\frac{1}{2})\sqrt{\pi}/\lambda < p < (n_p+\frac{1}{2})\sqrt{\pi}/\lambda\}$ for an even (odd) $n_p$, it can be inferred that the state is in $|+_\lambda\rangle$ ($|-_\lambda\rangle$).

Recall that one can change the aspect ratio of the ancilla GKP qubit (i.e., $\lambda$) to bias the noise towards a certain Pauli error. When $\lambda > 1$, the two-qubit gates in the surface code lattice of FIG. 1 introduce Z errors on the ancilla qubits with higher probability resulting in increased measurement error rates, while simultaneously reducing the probability of X errors on the ancilla qubits thus reducing the rate of space-time correlated errors (a subset of which are hook errors). The opposite is true for $\lambda < 1$.

In some embodiments, shift errors in each GKP qubit are constantly corrected by a teleportation-based GKP error correction protocol. Note that two fresh GKP qunaught states (114 in FIG. 1) are supplied to realize the teleportation-based GKP error correction. Thus, each data or ancilla GKP qubit (102 or 104) requires one mode to encode the quantum information and, assuming no multiplexing, two auxiliary modes (represented by white vertices 114 in FIG. 1) are needed to provide fresh GKP qunaught states for the GKP error correction. In this case, the number of required oscillator modes is three times the number of GKP qubits. Moreover, for each GKP qubit, one auxiliary qubit is needed to prepare the GKP qunaught states in the auxiliary modes. Such auxiliary qubits are represented by white squares 116 in FIG. 1. Hence, in some embodiments, the surface-GKP code requires a total of 291 physical modes, 97 qubits and hardware elements to support these modes. Note that if the GKP qunaught states are supplied in a multiplexed fashion, the extra overhead associated with the GKP error correction may be further reduced. However, despite the extra two auxiliary modes and one auxiliary qubit for each surface code qubit, the surface-GKP code requires fewer physical elements than the standard surface code consisting of bare qubits.

In some embodiments, data GKP qubits may be implemented using square lattices, whereas ancilla GKP qubits may be implemented using rectangular lattices.

Teleportation-Based GKP Error Correction

To correct for the shift errors with the GKP code, quadrature operators modulo are non-destructively measured at an appropriate spacing (e.g., momentum $\hat{q}$ modulo $\sqrt{\pi\lambda}$ and position $\hat{p}$ modulo $\sqrt{\pi\lambda}$ in the case of the rectangular lattice GKP code, or momentum $\hat{q}$ modulo $\sqrt{\pi}$ and position $\hat{p}$ modulo $\sqrt{\pi}$ in the case of a square lattice GKP code). In some embodiments, a teleportation-based GKP error correction method may be used, which requires two identical ancilla GKP states $|0_\lambda\rangle$, beam-splitter interactions, and homodyne measurements (see FIG. 2).

One of the advantages of the teleportation-based GKP error correction, is that it works with beam-splitter interactions and does not require any online squeezing operations. On the other hand, the Steane-type GKP error correction is based on the SUM gate and its inverse which do require squeezing operations in addition to beam-splitter interactions. The absence of squeezing operations in the teleportation-based method is especially convenient for optical systems since beam-splitter interactions are easier to realize than squeezing operations in the optics setting.

In some embodiments, performing the teleportation based error correction comprises initializing two ancilla GKP qubits for a given square data GKP qubit to be measured, wherein the two ancilla GKP qubits are initialized in a qunaught state $|\varnothing\rangle$ that carries no quantum information. The method of performing the teleportation based error correction further comprises applying a balanced beam-splitter interaction between the qunaught states of the ancilla GKP qubits to generate an encoded GKP-Bell state.

Once the GKP-Bell state is prepared, the beam-splitter interaction is applied between the modes 1 and 2 which is then followed by homodyne measurements of the quadrature operators $\hat{q}_1$ and $\hat{p}_1$. Such a measurement is the continuous-variable analog of the Bell measurement. Thus, the circuit in FIG. 2 implements quantum teleportation from the mode 1 to mode 3. This is why it is called a teleportation-based GKP error correction scheme. As a result, conditioned on the measurement outcomes $q_m$ and $p_m$, the output state is given by $$|\psi(q_m,p_m)\rangle_{Teleport} \propto \hat{\Pi}_\lambda \hat{D}(-\sqrt{2}(q_m+ip_m))|\psi\rangle$$

Figure 2:
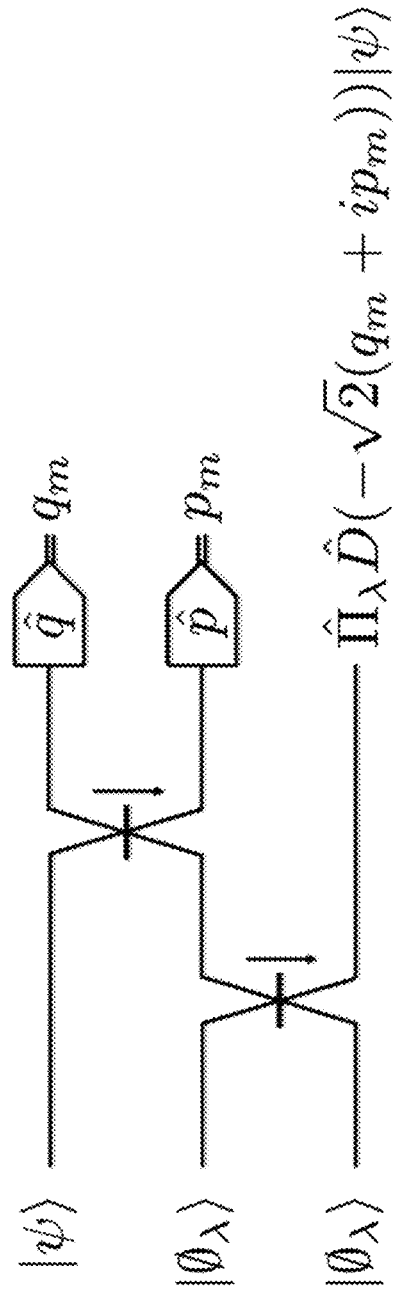
FIG. 2 illustrates an example teleportation-based GKP error correction protocol, according to some embodiments.
Figure 3:
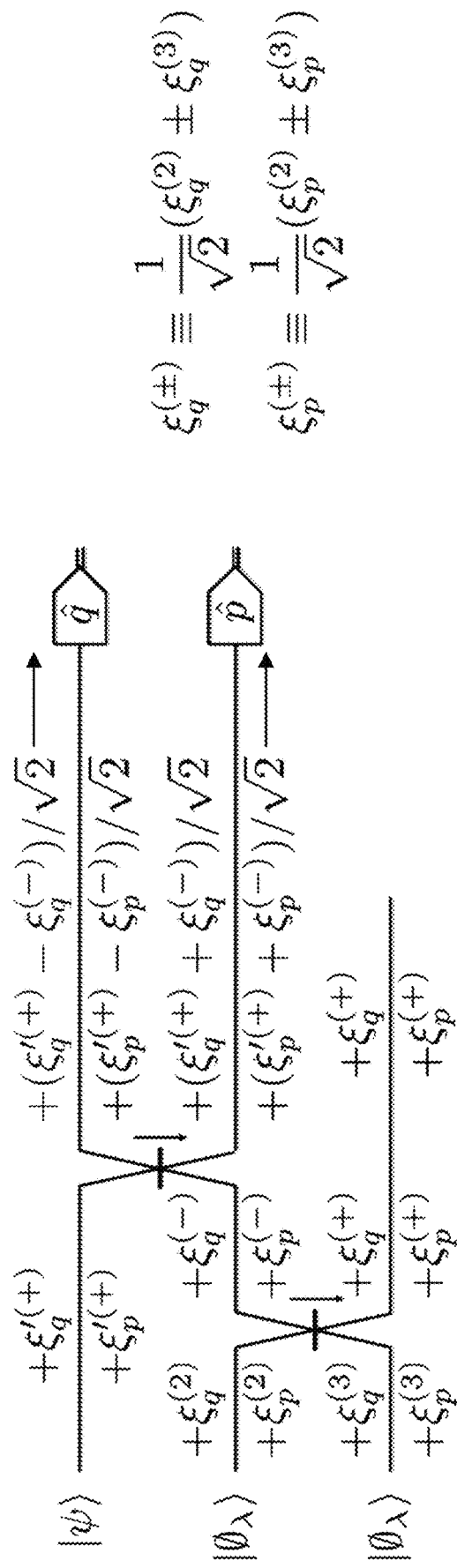
FIG. 3 illustrates additional details for the example teleportation-based GKP error correction protocol, according to some embodiments.

For example, FIG. 2 illustrates a teleportation-based error correction protocol, wherein measurement outcomes $q_m$ and $p_m$ are used in the above equation (also shown in FIG. 2) to determine the output state, where the measurements at the end of the circuits are a homodyne measurement of the position ($\hat{q}$) or the momentum ($\hat{p}$) operator.

Additional details regarding Teleportation-based GKP error correction are shown in FIGS. 3 and 4A-4D.

For example, in the case of the teleportation-based GKP error correction (shown in FIG. 3), the ancilla shift errors are mixed via the balanced beam-splitter interaction. Thus, the third mode (where the state is teleported to) has residual shift errors $\xi_q^{(+)}=(\xi_q^{(2)}+\xi_q^{(3)})/\sqrt{2}$ and $\xi_p^{(+)}=(\xi_p^{(2)}+\xi_p^{(3)})/\sqrt{2}$, which is then carried over to the next round of the GKP error correction. This also means that, in the current round, the data mode inherits residual shifts $\xi_q^{'(+)}$ and $\xi_p^{'(+)}$ from the previous round (note that $\xi_q^{'(+)}$ and $\xi_p^{'(+)}$ are defined similarly as $\xi_q^{(+)}$ and $\xi_p^{(+)}$). After the balanced beam-splitter interaction between the two ancilla modes, the second mode has shift errors $\xi_q^{(-)}=(\xi_q^{(2)}-\xi_q^{(3)})/\sqrt{2}$ and $\xi_p^{(-)}=(\xi_p^{(2)}-\xi_p^{(3)})/\sqrt{2}$. Note that since the quadrature transformation matrix of a beam-splitter interaction is an orthogonal matrix, the four shifts $\xi_q^{(+)}, \xi_p^{(+)}, \xi_q^{(-)}$, and $\xi_p^{(-)}$ are mutually independent just like the untransformed ancilla shifts $\xi_q^{(2)}, \xi_p^{(2)}, \xi_q^{(3)}$, and $\xi_p^{(3)}$. Note that the beam-splitter unitary operator is:

$$\hat{B}_{j\to k}(\theta) \equiv \exp[-i\theta(\hat{q}_j \hat{p}_k - \hat{p}_j \hat{q}_k)] = \exp[\theta(\hat{a}_j^\dagger \hat{a}_k - \hat{a}_j \hat{a}_k^\dagger)]$$

Wherein, in the Heisenberg picture, the quadrature operators are transformed via the beam splitter unitary $\hat{B}_{j\to k}(\theta)$ as follows:

$$\begin{bmatrix} \hat{q}_j \\ \hat{q}_k \\ \hat{p}_j \\ \hat{p}_k \end{bmatrix} \to \begin{bmatrix} \cos\theta & -\sin\theta & 0 & 0 \\ \sin\theta & \cos\theta & 0 & 0 \\ 0 & 0 & \cos\theta & -\sin\theta \\ 0 & 0 & \sin\theta & \cos\theta \end{bmatrix} \begin{bmatrix} \hat{q}_j \\ \hat{q}_k \\ \hat{p}_j \\ \hat{p}_k \end{bmatrix}$$

The shifts in the second mode are then mixed with the shifts in the data mode and the result is a net shift error $(\xi_q^{'(+)}-\xi_q^{(-)})/\sqrt{2}$ in the position quadrature and $(\xi_p^{'(+)}+\xi_p^{(-)})/\sqrt{2}$ in the momentum quadrature. Thus, the measurement outcomes are given by $q_m=(\xi_q^{'(+)}-\xi_q^{(-)})/\sqrt{2}$ and $p_m=(\xi_p^{'(+)}+\xi_p^{(-)})/\sqrt{2}$ modulo $\sqrt{\pi}\lambda/\sqrt{2}$ and $\sqrt{\pi}/(\sqrt{2}\pi\lambda)$, respectively. The actual shifts on the data qubit are given by $\sqrt{2}q_m$ and $\sqrt{2}p_m$ with an extra $\sqrt{2}$ factor. Thus, the relevant shifts (to be compared with the lattice spacings $\sqrt{\pi}\lambda$ and $\sqrt{\pi/\lambda}$) are $\xi_q^{'(+)}-\xi_q^{(-)}$ and $\xi_p^{'(+)}+\xi_p^{(-)}$ whose noise variances are given by $2\sigma_{gkp}^2$. Since the relevant noise variance is smaller in the teleportation-based GKP error correction scheme by a factor of 3/2, logical Pauli errors are less likely to occur in the teleportation based method than in other methods, such as the Steane-type method, given the same GKP squeezing $\sigma_{gkp}^{(dB)}$.

Note that since the weight of the Gaussian tail decreases exponentially in the inverse noise variance, the constant factor improvement in the noise variance can bring about a significant decrease in the logical Pauli error probabilities. Apart from the absence of the online squeezing operations and the enhanced resilience against the ancilla GKP noise, it is also remarked that the teleportation-based scheme is more advantageous for keeping the energy of the encoded state bounded than the Steane-type method. This is thanks to the symmetry between the position and the momentum quadratures in the teleportation-based scheme (which is related to the absence of online squeezing operations). Such a symmetry prevents the Gaussian envelope of the finitely-squeezed GKP states from being distorted during the GKP error correction, and hence minimizes the energy of the encoded GKP states.

Position and Momentum Measurements Including Analog Information related to Error Correction Confidence Due to the Heisenberg uncertainty principle there is always some uncertainty in position and momentum measurements. To deal with this uncertainty, position and momentum may be measured modularly with some spacing between decision intervals, such as $\sqrt{\pi}$, where the position or momentum is measured as a shift from a center of the decision interval such as a distance from zero in a direction towards $$+\frac{\sqrt{\pi}}{2}$$

or in the other direction towards $$-\frac{\sqrt{\pi}}{2}.$$

So that instead of measuring an exact position or momentum, the positon or momentum is measured relative to a center position of a modular quadrant having a size corresponding to plus and minus the decision boundary (e.g. a decision interval). As an example, FIGS. 5B and 5C illustrate quadrants using different methods to determine decision intervals. For example, in FIG. 5B decision interval boundaries are determined using a closest integer approach, whereas in FIG. 5C decision intervals are determined using a maximum likelihood approach. Note that the maximum likelihood approach better aligns the decision intervals with the probability densities as shown in FIG. 5A than is the case for the closest integer approach shown in FIG. 5B. Note that FIGS. 5A-5C are actually showing quadrants for two GKP qubits operated on by a CNOT gate. Thus in the single GKP qubit the decision intervals would span from $$-\sqrt{\pi}, \text{ to } -\frac{\sqrt{\pi}}{2}, -\frac{\sqrt{\pi}}{2} \text{ to } \frac{\sqrt{\pi}}{2}, \text{ and } \frac{\sqrt{\pi}}{2} \text{ to } \sqrt{\pi}.$$

Position and momentum measurements provide information as to where the qubit resides in a given modular cell, but does not provide information regarding which modular unit cell the position or momentum of the qubit resides in. Thus, a large shift across a decision boundary may appear as a small shift within an adjacent quadrant. Because of this state of affairs, shifts in position or momentum with measured results close to decision boundaries are more likely to be incorrect because it is possible that the shift could be a large shift across the decision boundary or a smaller shift that stops short of the decision boundary in an adjacent quadrant. Conversely shifts in position or momentum that are more further removed from the decision boundaries are more likely to be correct. This is because the likelihood of a large shift crossing a decision boundary and extending further away from the crossed decision boundary is less likely than a shift terminating closer to the crossed decision boundary.

In some embodiments, analog information is generated along with the position and momentum measurements, wherein the analog information indicates a relative closeness to a decision boundary for a given position or momentum measurement. Thus the measurement itself is collected and additional analog information is generated that can be used to determine a confidence level in the measurement information or in later uses of the measurement information such as a confidence in an error-correction performed on the GKP qubit.

Moreover, when maximum likelihood decision boundaries are used as shown in FIG. 5C, the analog information provides even better confidence and reduces errors because the decision boundaries and the probability densities are more closely aligned.

When preparing a GKP qubit, such shifts in position and momentum are unavoidable and must be corrected back to the code space, for example using the measured position and momentum shifts.

As further discussed below, the analog information (or confidence values generated using the analog information) can be provided for use in an edge graph matching, wherein edges for GKP qubits for which there is a high level of confidence in the error correction are weighted more heavily than other edges for other GKP qubits for which there is less confidence in the error correction (for example due to the shift falling close relative to a decision boundary leading to ambiguities whether the shift is a long shift crossing a decision boundary into an adjacent quadrant or a shorter shift in a given quadrant).

Not only can position and momentum be measured and corresponding analog information be generated for a single GKP qubit, a similar process can be carried out for a pair of two GKP qubits operated on by a logical gate, such as a CNOT gate. In such a case, there are two positions and two momentums that are being measured. For example, as mentioned above, FIGS. 5A-5C show probability densities and quadrants for position and momentum measurements using both a closest integer decoding protocol and a maximum likelihood protocol (that more closely aligns the decision boundaries with the probability densities).

Note that in some embodiments, position and momentum for a given GKP qubit is within a square lattice. However, in some embodiments, a GKP qubit can be squeezed, such that either position or momentum is confined to a smaller span than the other one. In such situations lambda ($\lambda$) represents a squeezing factor. Where the total span is $-\sqrt{\pi}$ to $\sqrt{\pi}$ for both position and momentum in a square lattice and is squeezed by a factor $\lambda$ such that at least one of the spans of position or momentum is increased or reduced such as to span $\pm\sqrt{\pi}\lambda$ or $$\pm \frac{\sqrt{\pi}}{\lambda}.$$

For example, taking a GKP squeezing $\sigma_{gkp}^{(dB)}=10$ dB and converting it to the noise variance $\sigma_{gkp}^2$, it is found that $$\sigma_{gkp}^2 = \frac{1}{2}10^{-\sigma_{gkp}^{(dB)}/10} = 0.05$$

at $\sigma_{gkp}^{(dB)}=10$ dB. This noise variance is doubled because there is one carried over from the previous round of the GKP error correction and another one that is added from the current round. Thus, the relevant noise variance due to the finite GKP squeezing is given by $2\sigma_{gkp}^2=0.1$ at $\sigma_{gkp}^{(dB)}=10$ dB. On the other hand, the additional noise variance due to the photon loss is given by $kt_G$ (assuming amplification with the same rate), where k is the photon loss rate and $t_G$ is the gate time. Thus, if the gate time $t_G$ is 100 times shorter than the single photon relaxation time 1/k, the extra noise variance due to the photon loss is only about $kt_G=0.01$. Note that even at $\sigma_{gkp}^{(dB)}=13$ dB, there is $2\sigma_{gkp}^2 \gtrsim 0.05$ and thus the noise variance due to finite GKP squeezing dominates. Hence, as a zeroth order approximation, it is acceptable to focus on the case where the finite squeezing of the ancilla GKP states is the only noise source. However, the maximum likelihood decoding method presented herein applies to more general cases, e.g., with extra noise due to photon losses.

Figure 4A:
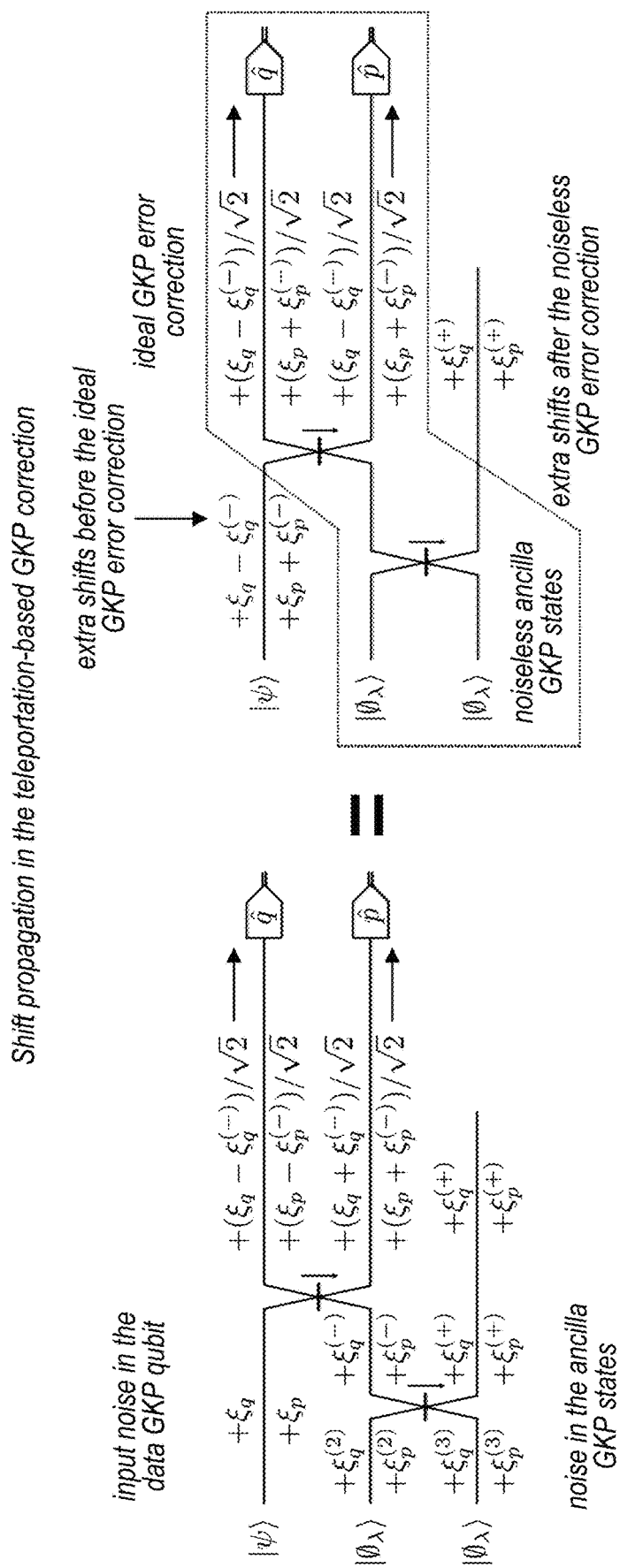
FIG. 4A illustrates shift propagation in the example teleportation-based GKP error correction protocol, according to some embodiments.
Figure 4B:
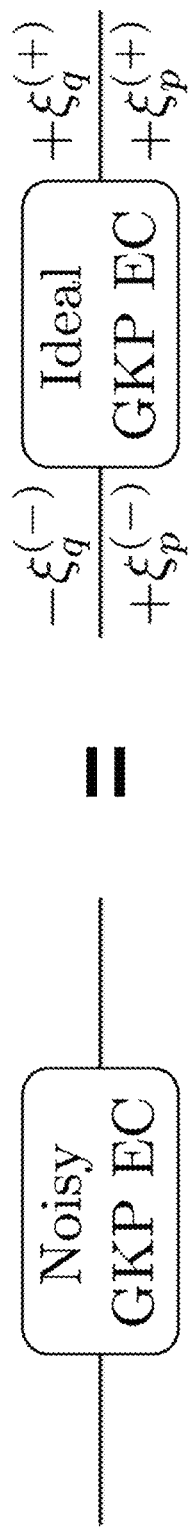
FIG. 4B illustrates a simplified model of the teleportation-based GKP error correction protocol wherein the noisy teleportation-based GKP error correction is understood as an ideal GKP error correction preceded by and followed by extra random shift errors, according to some embodiments.
Figure 4C:
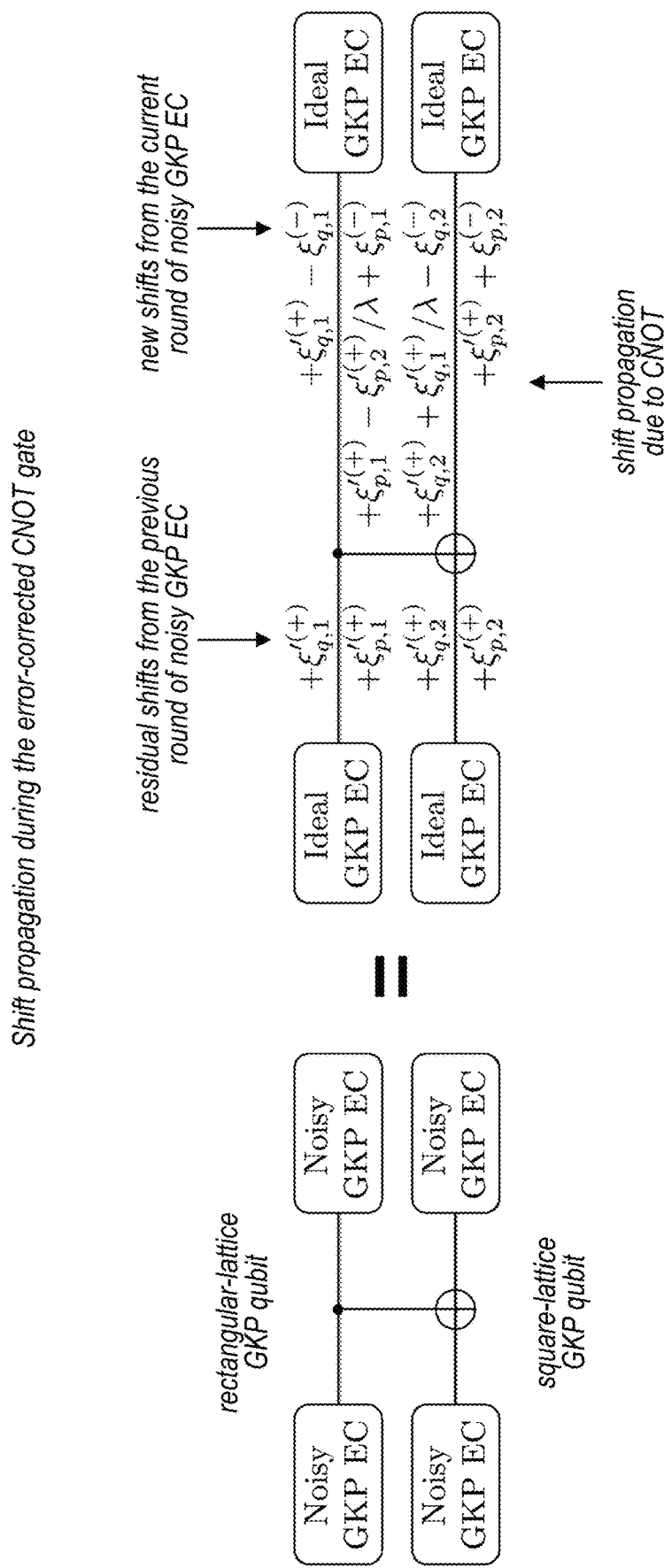
FIG. 4C illustrates the simplified model applied for a CNOT gate, according to some embodiments.

Before analyzing the error-corrected logical CNOT and CZ gate for the GKP qubits, it is remarked that a noisy (teleportation-based) GKP error correction with finitely squeezed ancilla GKP states can be understood as an ideal GKP error correction preceded and followed by extra shift errors $(-\xi_q^{(-)}, \xi_p^{(-)})$ and $(\xi_q^{(+)}, \xi_p^{(+)})$, respectively, where $\xi_q^{(-)}, \xi_p^{(-)}, \xi_q^{(+)}$, and $\xi_p^{(+)} \sim_{iid} N(0, \sigma_{gkp}^2)$ (See FIGS. 4A and 4B). This circuit identity is used throughout the analysis of the error-corrected two qubit gates between GKP qubits.

Error-Corrected CNOT Gate

Recall that the logical CNOT gate between two GKP qubits can be realized by a qp coupling. In the following discussion, it is assumed that the first qubit is a rectangular lattice GKP qubit with $\lambda \geq 1$ and the second qubit is the square-lattice GKP qubit. As shown in in FIG. 4C, before the CNOT gate is applied, the GKP qubits inherit shift errors $(\xi'_{q,1}{}^{(+)}, \xi'_{p,1}{}^{(+)})$ and $(\xi'_{q,2}{}^{(+)}, \xi'_{p,2}{}^{(+)})$ from the previous round of the noisy GKP error correction. These shifts are propagated through the CNOT gate as $(\xi'_{q,1}{}^{(+)}, \xi'_{p,1}{}^{(+)} - \xi'_{p,2}{}^{(+)}/\lambda)$ and $(\xi'_{q,2}{}^{(+)} + \xi'_{q,1}{}^{(+)}/\lambda, \xi'_{p,2}{}^{(+)})$. Then, due to the additional noise from the GKP error correction after the CNOT gate, extra shift errors $(-\xi_{q,1}^{(-)}, \xi_{p,1}^{(-)})$ and $(-\xi_{q,2}^{(-)}, \xi_{p,2}^{(-)})$ are added to the quadratures. Consequently, the two GKP qubits have net shifts $$\xi_q^{(1)} = \xi'_{q,1}{}^{(+)} - \xi_{q,1}^{(-)},$$

$$\xi_p^{(1)} = \xi'_{p,1}{}^{(+)} - \frac{1}{\lambda}\xi'_{p,2}{}^{(+)} + \xi_{p,1}^{(-)},$$

$$\xi_q^{(2)} = \xi'_{q,2}{}^{(+)} + \frac{1}{\lambda}\xi'_{q,1}{}^{(+)} - \xi_{q,2}^{(-)},$$

$$\xi_p^{(2)} = \xi'_{p,2}{}^{(+)} + \xi_{p,2}^{(-)}.$$

Since all eight underlying shifts $\xi_{q,1}{}^{(+)}, \ldots, \xi_{p,2}{}^{(+)}$ and $\xi_{q,1}{}^{(-)}, \ldots, \xi_{q,2}{}^{(-)}$ are randomly drawn from an independent and identically distributed Gaussian distribution $N(0, \sigma_{gkp}^2)$, there are noise variances $\text{Var}(\xi_q^{(1)}) = \text{Var}(\xi_p^{(2)}) = 2\sigma_{gkp}^2$ and $$\text{Var}(\xi_q^{(2)}) = \text{Var}(\xi_p^{(1)}) = \left(2 + \frac{1}{\lambda^2}\right)\sigma_{gkp}^2.$$

That is, the position quadrature of the target mode and the momentum quadrature of the control mode have higher noise variances than the other quadratures due to the noise propagation. A motivation for using a rectangular-lattice GKP qubit $\lambda \geq 1$ in the first qubit is to mitigate the enhanced noise variance via the $1/\lambda$ suppression. However, since the momentum spacing of the first qubit is decreased by a factor of $\lambda$, the Z error rate on the first qubit is enhanced as a result.

Given these shift errors, the measurement outcomes in the GKP error correction (at the end of the CNOT gate) are given by:

$$\sqrt{2} q_m^{(1)} = \xi_q^{(1)} + n_q^{(1)}\sqrt{\pi}\lambda,$$

$$\sqrt{2} p_m^{(1)} = \xi_p^{(1)} + n_p^{(1)}\sqrt{\pi}/\lambda,$$

$$\sqrt{2} q_m^{(2)} = \xi_q^{(2)} + n_q^{(2)}\sqrt{\pi},$$

$$\sqrt{2} p_m^{(2)} = \xi_p^{(2)} + n_p^{(2)}\sqrt{\pi}.$$

Given these measurement outcomes, the goal of the decoding is to correctly infer the four integers $n_q^{(1)}, n_p^{(1)}, n_q^{(2)}$, and $n_p^{(2)}$. In some embodiments, a maximum likelihood decoding is used, which is based on an observation that the net shifts errors are mutually correlated. For instance, the net position shifts $\xi_q^{(1)}$ and $\xi_q^{(2)}$ are correlated via the propagated shift $\xi'_{q,1}{}^{(+)}$. More specifically, the position shift vector $\xi_q \equiv (\xi_q^{(1)}, \xi_q^{(2)})^T$ follows a two-variable Gaussian distribution $N(0, V_{\xi_q})$ with zero mean and a covariance matrix $$V_{\xi_q} = \begin{bmatrix} \text{Var}(\xi_q^{(1)}) & \text{Cov}(\xi_q^{(1)}, \xi_q^{(2)}) \\ \text{Cov}(\xi_q^{(1)}, \xi_q^{(2)}) & \text{Var}(\xi_q^{(2)}) \end{bmatrix} = \sigma_{gkp}^2 \begin{bmatrix} 2 & 1/\lambda \\ 1/\lambda & 2+1/\lambda^2 \end{bmatrix}.$$

Due to the correlation, shifts in a certain direction are more likely to happen than others. In other words, a larger shift in a preferred direction can occur more often than a smaller shift in a less preferred direction (see the top panel of FIG. 5A.

Such a possibility is not taken into account in other error correction methods, such as the simple closest-integer decoding.

Note that the probability density function of the position shifts $\xi_q^{(1)}, \xi_q^{(2)}$ is given by:

$$P_{CNOT}^{[qq]}(\xi_q^{(1)}, \xi_q^{(2)}) = \frac{1}{2\pi\sqrt{|V_{\xi_q}|}} \exp\left[-\frac{1}{2}\xi_q^T V_{\xi_q}^{-1} \xi_q\right] =$$

$$\frac{1}{2\pi\sqrt{\left(4+\frac{1}{\lambda^2}\right)\sigma_{gkp}^2}} \times \exp\left[-\frac{\left(2+\frac{1}{\lambda^2}\right)(\xi_q^{(1)})^2 + 2(\xi_q^{(2)})^2 - \frac{2}{\lambda}\xi_q^{(1)}\xi_q^{(2)}}{2\left(4+\frac{1}{\lambda^2}\right)\sigma_{gkp}^2}\right]$$

where $|V_{\xi_q}|$ is the determinant of $V_{\xi_q}$. Then the goal of the maximum likelihood decoding is as follows. Given the measurement outcomes $\sqrt{2}q_m^{(1)}$ and $\sqrt{2}q_m^{(2)}$, find $n_q^{(1)}$ and $n_q^{(2)}$ such that $P_{CNOT}^{[qq]}(\xi_q^{(1)}, \xi_q^{(2)})$ is maximized, where $\xi_q^{(1)} = \sqrt{2}q_m^{(1)} - n_q^{(1)}\sqrt{\pi}\lambda$ and $\xi_q^{(2)} = \sqrt{2}q_m^{(2)} - n_q^{(2)}\sqrt{\pi}$. Since $P_{CNOT}^{[qq]}(\xi_q^{(1)}, \xi_q^{(2)})$ is maximized when $$\left(2+\frac{1}{\lambda^2}\right)(\xi_q^{(1)})^2 + 2(\xi_q^{(2)})^2 - \frac{2}{\lambda}\xi_q^{(1)}\xi_q^{(2)}$$

is minimized, the is equivalent to solving the following optimization problem:

$$(n_q^{*(1)}, n_q^{*(2)}) = \operatorname{argmin}\left(\left(2+\frac{1}{\lambda^2}\right)(x_1)^2 + 2(x_2)^2 - \frac{2}{\lambda}x_1 x_2\right),$$

where $x_1 \equiv \sqrt{2}q_m^{(1)} - n_1\sqrt{\pi}\lambda$, $x_2 \equiv \sqrt{2}q_m^{(2)} - n_2\sqrt{\pi}$ given $\sqrt{2}q_m^{(1)}$ and $\sqrt{2}q_m^{(2)}$ (which are measured values).

Note that FIG. 5C shows the decision boundaries of the maximum likelihood method, which are contrasted with the decision boundaries of the closest integer approach shown in FIG. 5B. Note that the decision boundaries in the maximum likelihood method are better aligned with the corresponding probability density functions than the ones in the closest-integer decoding. Thus, there are shifts that can be correctly countered by the maximum likelihood method but are incorrectly mapped to a different lattice point, hence causing a logical Pauli error, in the closest-integer decoding.

Similarly as in the case of the position shifts, the momentum shifts and $\xi_p^{(1)}$ and $\xi_p^{(2)}$ are also mutually correlated via the propagated shift $\xi'_{p,2}{}^{(+)}$ Hence the momentum shift vector, $\xi_p \equiv (\xi_p^{(1)}, \xi_p^{(2)})^T$ follows a two-variable Gaussian distribution $N(0, V_{\xi_p})$ with zero mean and a covariance matrix $$V_{\xi_p} = \sigma_{gkp}^2 \begin{bmatrix} 2+\frac{1}{\lambda^2} & -1/\lambda \\ -1/\lambda & 2 \end{bmatrix}.$$

The probability density function of the momentum shifts and $\xi_p^{(1)}$ and $\xi_p^{(2)}$ (e.g. see bottom panel of FIG. 5A) are given by:

$$P_{CNOT}^{[pp]}(\xi_p^{(1)}, \xi_p^{(2)}) =$$

$$\frac{1}{2\pi\sqrt{\left(4+\frac{1}{\lambda^2}\right)\sigma_{gkp}^2}} \times \exp\left[-\frac{(\xi_p^{(1)})^2 + \left(2+\frac{1}{\lambda^2}\right)(\xi_p^{(2)})^2 + \frac{2}{\lambda}\xi_p^{(1)}\xi_p^{(2)}}{2\left(4+\frac{1}{\lambda^2}\right)\sigma_{gkp}^2}\right]$$

The goal in the decoding is then to find the two integers $n_p^{(1)}$ and $n_p^{(2)}$, given the measurement outcomes $\sqrt{2}p_m^{(1)}$ and $\sqrt{2}p_m^{(2)}$, such that $P_{CONT}^{[pp]}(\xi_p^{(1)}, \xi_p^{(2)})$ is maximized where $\xi_p^{(1)} = \sqrt{2}p_m^{(1)} - n_p^{(1)}\sqrt{\pi}/\lambda$ and $\xi_p^{(2)} = \sqrt{2}p_m^{(2)} - n_p^{(2)}\sqrt{\pi}$. This can be done by solving the optimization problem $$(n_q^{*(1)}, n_q^{*(2)}) = \operatorname{argmin}_{n_1,n_2}\left(2(x_1)^2 + \left(2+\frac{1}{\lambda^2}\right)(x_2)^2 + \frac{2}{\lambda}x_1 x_2\right),$$

where $x_1 \equiv \sqrt{2}p_m^{(1)} - n_1\sqrt{\pi}/\lambda$, $x_2 \equiv \sqrt{2}p_m^{(2)} - n_2\sqrt{\pi}$ given $\sqrt{2}p_m^{(1)}$ and $\sqrt{2}p_m^{(2)}$ (which are measured values).

Error-Corrected CZ Gate

The logical CZ gate between a rectangular-lattice GKP qubit and a square-lattice GKP qubit can be realized by a qq coupling. It is assumed that the first qubit is encoded in a rectangular-GKP code with $\lambda \geq 1$ and the second qubit is encoded in the square-lattice GKP code. Similarly as in the case of the CNOT gate, the GKP qubits inherit shift errors $(\xi'_{q,1}{}^{(+)}, \xi'_{p,1}{}^{(+)})$ and $(\xi'_{q,2}{}^{(+)}, \xi'_{p,2}{}^{(+)})$ from the previous round of the noisy GKP error correction. These shift errors are propagated via the CZ gate as $(\xi'_{q,1}{}^{(+)}, \xi'_{p,1}{}^{(+)} + \xi'_{p,2}{}^{(+)}/\lambda)$ and $(\xi'_{q,2}{}^{(+)}, \xi'_{p,2}{}^{(+)} + \xi'_{q,1}{}^{(+)}/\lambda)$. Then, due to the additional noise from the GKP error correction after the CZ gate, extra shift errors $(-\xi_{q,1}{}^{(-)}, \xi_{p,1}{}^{(-)})$ and $(-\xi_{q,2}{}^{(-)}, \xi_{p,2}{}^{(-)})$ are added to the quadratures. Consequently, the two GKP qubits have net shifts $$\xi_q^{(1)} = \xi'_{q,1}{}^{(+)} - \xi_{q,1}^{(-)},$$

$$\xi_p^{(1)} = \xi'_{p,1}{}^{(+)} - \frac{1}{\lambda}\xi'_{p,2}{}^{(+)} + \xi_{p,1}^{(-)},$$

$$\xi_p^{(2)} = \xi'_{p,2}{}^{(+)} + \xi_{p,2}^{(-)},$$

$$\xi_q^{(2)} = \xi'_{q,2}{}^{(+)} + \frac{1}{\lambda}\xi'_{q,1}{}^{(+)} - \xi_{q,2}^{(-)}.$$

Figure 4D:
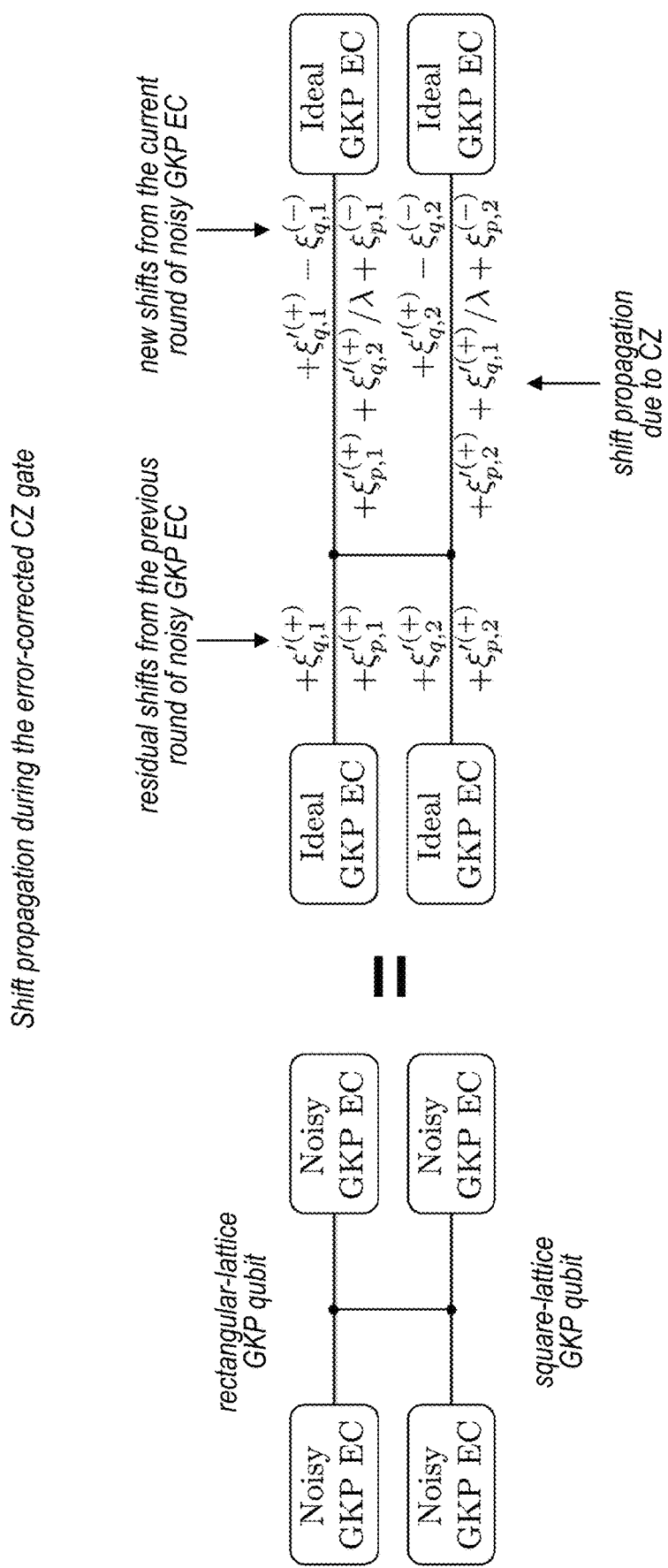
FIG. 4D illustrates the simplified model applied for a CZ gate, according to some embodiments.

For example this is shown in FIG. 4D. Since the noise correlation structure is equivalent to that of the CNOT gate (up to permutation and sign change), the rest of the analysis, including the maximum likelihood decoding, can be performed in an analogous way.

Edge Weights in the Matching Graphs

FIGS. 6A-6D illustrate matching graphs used in the implementation of a Minimum Weight Perfect Matching (MWPM) algorithm with weighted edges. Two-dimensional bulk and boundary edges are distinguished by their associated labels since such edges will have different weights. Vertical edges used for detecting measurement errors are dashed. Lastly, consider the space-time correlated edges in FIGS. 6B and 6D used for detecting errors arising from CNOT/CZ failures which result in errors with a spatial and temporal component. Such edges are distinguished by their labels and associated grey-scale colors. For instance, space-time correlated edges are labelled $P_{bulk}^{(3D)}$.

When the extra analog information as described above is used to determine the weights of the edges, the conditional probabilities for the failure rates of each circuit component is computed dynamically for every gate, idle, state-preparation and measurement location at each time step. As such, all circuit components can have different conditional probabilities at every location and in each syndrome measurement round. Hence edge weights for the matching graphs cannot be pre-computed and must be updated dynamically.

Given the above, let t be the number of syndrome measurement rounds for a surface with minimum weight logical X operator $d_x$ and minimum weight logical Z operator $d_z$. A matrix ($P_e$) can be formed, wherein t is the number of syndrome measurement rounds, n corresponds to the number of data qubits, $m_1$ corresponds to the number of X-type stabilizers and $m_2$ corresponds to the number of Z-type stabilizers.

In some embodiments, a matrix that is a $1 \times t(3n+62m_1+62m_2)$ is defined (e.g. matrix $P_e$), wherein $n=d_x d_z$, $m_1=(d_x+1)(d_z-1)/2$, and $m_2=(d_z+1)(d_x-1)/2$. Here, t is the number of syndrome measurement rounds, n corresponds to the number of data qubits, $m_1$ corresponds to the number of X-type stabilizers and $m_2$ corresponds to the number of Z-type stabilizers.

In some embodiments, the $P_e$ matrix can be decomposed into t blocks and each block can be decomposed into three sub-matrices $N^{(j)}=[M_1^{(j)}|M_2^{(j)}|M_3^{(j)}]$ where $j \in \{1, 2, \ldots, t\}$. The matrix $M_1^{(j)}$ is $1 \times 3n$, $M_2^{(j)}$ is $1 \times 62 m_1$, and $M_3^{(j)}$ is $1 \times 62 m_2$.

In some embodiments, the 3n columns of the sub-matrix $M_1^{(j)}$ can be decomposed into n blocks, where the k'th block stores the conditional probabilities for X, Y and Z Pauli errors arising from idling fault locations on the k'th data qubit and in the j'th syndrome measurement round (ancilla qubits have no idling fault locations). Note that data qubits on the boundaries of the lattice can have more than one idling fault location in a given syndrome measurement round (for instance, if three two-qubit gates interact with a data qubit with an idling location in between two gates). However, without accounting for photon loss, all idling fault locations can be set at the beginning of a syndrome measurement round and thus incorporates the measurement and reset wait time. As such, it can be written:

$$M_1^{(j)} = [P_{q_1,j}^{(X)}, P_{q_1,j}^{(Y)}, P_{q_1,j}^{(Z)}, \ldots, P_{q_n,j}^{(X)}, P_{q_n,j}^{(Y)}, P_{q_n,j}^{(Z)}]$$

where, for instance, $P_{q_k,j}^{(X)}$ is the conditional probability of a Pauli X error on the k'th data qubit during the j'th syndrome measurement round arising from an idling fault location.

The $62m_1$ columns of the $M_2^{(j)}$ can be decomposed into $m_1$ blocks, where the k'th block stores all conditional probabilities arising from fault locations on the k'th ancilla for X-type stabilizer measurements during the j'th syndrome measurement round. It is noted that by default, a fault location for a two-qubit gate is considered to be on the control-qubit of such a gate, and the control qubit of a CZ gate is set to be on the ancilla qubit. On a given ancilla qubit, there are 62 fault locations: one for the $|+\rangle$ state preparation, one for the X-basis measurement, and each of the four two-qubit gates can fail introducing a two-qubit Pauli error $P_1 \otimes P_2$ (of which there are 15 non-trivial possibilities). Since the ordering is important for understanding, take the following definition:

$$\tilde{P}_{a_m^{(x)}}^{(t_s;j)} = \begin{bmatrix} P_{IX}^{(t_s;j)}, P_{IZ}^{(t_s;j)}, P_{IY}^{(t_s;j)}, P_{XI}^{(t_s;j)}, P_{XX}^{(t_s;j)}, P_{XZ}^{(t_s;j)}, P_{XY}^{(t_s;j)}, P_{ZI}^{(t_s;j)}, P_{ZX}^{(t_s;j)}, \\ P_{ZZ}^{(t_s;j)}, P_{ZY}^{(t_s;j)}, P_{YI}^{(t_s;j)}, P_{YX}^{(t_s;j)}, P_{YZ}^{(t_s;j)} P_{YY}^{(t_s;j)}, \end{bmatrix}$$

where $t_s \in \{1, 2, 3, 4\}$, $a_m^{(x)}$ corresponds to the m'th ancilla for X-type stabilizers and $$P_{P_1 P_2}^{(t_s;j)}$$

corresponds to a conditional probability for the error $P_1 \otimes P_2$ occurring on a CNOT gate in time-step $t_s$ during the j'th syndrome measurement round. Hence $\tilde{P}_{a_m^{(x)}}^{(t_s;j)}$ stores the conditional probabilities of all 15 two-qubit Pauli errors for the CNOT gate applied in time step $t_s$ during the j'th syndrome measurement round and which interacts with the ancilla $a_m^{(x)}$. It is noted that for ancillas used in measuring a weight-two X-type stabilizer, if no CNOT gates are applied in time step $t_s$, all terms in the above equation are set to zero. Then it can be written:

$$M_2^{(j)} = \begin{bmatrix} P_{a_1^{(x)}}^{(S_z)}, \tilde{P}_{a_1^{(x)}}^{(t_1;j)}, \tilde{P}_{a_1^{(x)}}^{(t_2;j)}, \tilde{P}_{a_1^{(x)}}^{(t_3;j)}, \tilde{P}_{a_1^{(x)}}^{(t_4;j)}, P_{a_1^{(x)}}^{(M_z)}, \ldots, \\ P_{a_{m_1}^{(x)}}^{(S_z)}, \tilde{P}_{a_{m_1}^{(x)}}^{(t_1;j)}, \tilde{P}_{a_{m_1}^{(x)}}^{(t_2;j)}, \tilde{P}_{a_{m_1}^{(x)}}^{(t_3;j)}, \tilde{P}_{a_{m_1}^{(x)}}^{(t_4;j)}, P_{a_{m_1}^{(x)}}^{(M_z)} \end{bmatrix}$$

where $P_{a_l^{(x)}}^{(S_z)}$ and $P_{a_l^{(x)}}^{(M_z)}$ are the conditional probabilities for state-preparation and measurement errors on the l'th ancilla qubit for X-type stabilizer measurements. It is also noted that a convention is used where ancillas for X-type stabilizers are labeled top-bottom and left to right in the surface code lattice shown in FIG. 1.

The $62m_2$ columns of $M_3^{(j)}$ are divided into $m_2$ blocks where the k'th block stores all conditional probabilities arising from fault locations on the k'th ancilla for Z-type stabilizer measurements during the j'th syndrome measurement round. The vector $\tilde{P}_{a_m^{(z)}}^{(t_s;j)}$ can be defined in a similar way as above for $P_{a_m^{(x)}}^{(t_s;j)}$, where the term $$P_{P_1 P_2}^{(t_s;j)}$$

corresponds to a conditional probability for the error $P_1 \otimes P_2$ occurring during a CZ gate in time-step $t_s$ during the j'th syndrome measurement round. Then it can be written:

$$M_3^{(j)} = \begin{bmatrix} P_{a_1^{(z)}}^{(S_z)}, \tilde{P}_{a_1^{(z)}}^{(t_1;j)}, \tilde{P}_{a_1^{(z)}}^{(t_2;j)}, \tilde{P}_{a_1^{(z)}}^{(t_3;j)}, \tilde{P}_{a_1^{(z)}}^{(t_4;j)}, P_{a_1^{(z)}}^{(M_z)}, \ldots, \\ P_{a_{m_1}^{(z)}}^{(S_z)}, \tilde{P}_{a_{m_1}^{(z)}}^{(t_1;j)}, \tilde{P}_{a_{m_1}^{(z)}}^{(t_2;j)}, \tilde{P}_{a_{m_1}^{(z)}}^{(t_3;j)}, \tilde{P}_{a_{m_1}^{(z)}}^{(t_4;j)}, P_{a_{m_1}^{(z)}}^{(M_z)} \end{bmatrix}$$

where $P_{a_l^{(j)}}^{(S_z)}$ and $P_{a_l^{(j)}}^{(M_z)}$ are the conditional probabilities for state-preparation and measurement errors on the l'th ancilla qubit for Z-type stabilizer measurements.

From the above, the $P_e$ matrix can be written as:

$$P_e = [N^{(1)}, N^{(2)}, \ldots, N^{(t)}],$$

where $N^{(j)}$ is computed using the above equations. After performing all t syndrome measurement rounds and generating the $P_e$ matrix, edge weights can be computed by extracting the appropriate terms in the $P_e$ matrix.

In some embodiments, a method of decoding a surface code using dynamically determined edge weights taking into account error correction confidence reflected in analog data generated when measuring position and momentum includes receiving a syndrome measurement history for syndrome measurements of error-corrected GKP qubits of the surface code. The method further includes receiving analog information or confidence values indicating respective levels of confidence in error corrections for the GKP qubits of the surface code, wherein the confidence values are determined based on the analog information, and wherein the analog information indicates relative amounts respective position operators ($\hat{q}$) or respective momentum operators ($\hat{p}$) of the GKP qubits were shifted relative to a decision boundary when performing error correction. Additionally, the method includes determining edges between syndrome measurements for respective ones of the GKP qubits of the surface code for, or across, one or more rounds of the syndrome measurements, wherein the determined edges comprise space-time correlated edges and/or two-dimensional edges. Also the method comprises selecting the correct conditional probabilities obtained in a dynamical fashion from the $P_e$ matrix which is used for obtaining the correct weightings of each edge. Additionally, the method comprises determining weightings for the edges, wherein the analog information or the confidence values are used to determine the weightings, wherein GKP qubits with analog information or confidence values indicating higher confidence in error correction for the respective GKP qubits are weighted more heavily than other respective GKP qubits for which the analog information or the confidence values indicate less confidence in error correction for the other respective GKP qubits and applying a minimum weight perfect matching (MWPM) to the weighted edges to decode the surface code.

Preparing a Qunaught State Using a Three-Level Ancilla System

In some situations there may be adverse consequence of ancilla decay in the performance of GKP state stabilizations. For example, an ancilla decay can cause a large shift in the cavity mode (e.g. GKP data qubit). That is, if the ancilla (e.g. transmon) decays from $|1\rangle$ to $|0\rangle$ during a conditional displacement the cavity state is displaced in the wrong direction, possibly by a large amount depending on when the ancilla decayed (see FIG. 7A). Indeed, as shown in FIG. 7C the achievable squeezing may be reduced due to ancilla decay.

To mitigate the effects of ancilla decay, a third level of the ancilla may be used. That is, the ground state $|0\rangle$ and the second excited state $|2\rangle$ are the main ancilla qubit base states. Thus if the ancilla qubit decays from excited state $|2\rangle$ to excited state $|1\rangle$, the effect on the shift in the cavity mode and the achievable squeezing is minimal, as shown in FIGS. 7B and 7C.

For example, a three-level ancilla system comprises a first level (e.g. ground state), a second level (e.g. first excited state or buffer state), and a third level (e.g. second excited state or main state). The three-level ancilla system is configured such that cavity displacement of an auxiliary mode is maintained when the three-level ancilla system is in the second excited state corresponding to the third level of the three-level ancilla system and when the three-level ancilla system is in a first excited state corresponding to a second level of the three-level ancilla system. Thus, the three-level ancialla system is configured to maintain the cavity displacement of the auxiliary mode despite photon loss or decay that causes the three-level ancilla system to transition from the second excited state to the first excited state. In some embodiments, the the cavity displacement of the auxiliary mode results in a squeezing of 11 decibels (dB) or more for a GKP qunaught state used to implement the auxiliary mode. In some such embodiments, the three-level ancilla system is configured to maintain the cavity displacement such that the squeezing of a GKP qunaught state used to implement the auxiliary mode remains at or above 11 dB when the three-level ancilla system decays from the second excited state corresponding to the third level of the three-level ancilla system to the first excited state corresponding to the second level of the three-level ancilla system.

In some embodiments, a qunaught state is prepared using a three-level ancilla system, wherein the qunaught state is prepared in an auxiliary mode for data and ancilla Gottesman Kitaev Preskill (GKP) qubits of a surface GKP code. The three-level ancilla system maintains a cavity displacement of the auxiliary mode associated with the three-level ancilla system when the three-level ancilla system is in a second excited state corresponding to a third level of the three-level ancilla system and when the three-level ancilla system is in a first excited state corresponding to a second level of the three-level ancilla system.

In some embodiments, the ancilla transmon is initialized to a state $|+'\rangle = (|0\rangle + |2\rangle)/\sqrt{2}$ instead of $|+\rangle = (|0\rangle + |1\rangle)/\sqrt{2}$. Also, the single-qubit rotation $\hat{R}_\theta = [-i\theta(|0\rangle\langle 1| + |1\rangle\langle 0|)/2]$ is replaced by $\hat{R}'_\theta = [-i\theta(|0\rangle\langle 2| + |2\rangle\langle 0|)/2]$, and the annihilation operator of the ancilla transmon is replaced by $\hat{b} = |0\rangle\langle 1| + \sqrt{2}|1\rangle\langle 2|$. It is noted that it is assumed the second excited state of the transom decays twice faster than the first excited state. A key feature of this three-level ancilla scheme is to use the first excited state $|1\rangle$ of the transmon as a buffer state for possible single transmon decay events (from $|2\rangle$ to $|1\rangle$). For example, to make sure that the cavity mode is displaced in the right direction by the same amount even upon a single transmon decay, the conditional displacement operation is particularly engineered. For example, this can be realized via the following Hamiltonian:

$$\hat{H} \propto \hat{q}(-|0\rangle\langle 0| + |1\rangle\langle 1| + |2\rangle\langle 2|),$$

or $\hat{H} \propto \hat{p}(-|0\rangle\langle 0| + |1\rangle\langle 1| + |2\rangle\langle 2|)$. In this case, even if the second excited state $|2\rangle$ of the transmon decays to its first excited state $|1\rangle$, the above Hamiltonian still generates the same displacement in the cavity mode. Thus, regardless of when the transmon decays from $|2\rangle$ to $|1\rangle$, the cavity mode is still displaced by $l_q$ or $l_{qp}$ (relative to the case where the transmon is in the ground state $|0\rangle$) which is approximately equal to $\sqrt{2\pi}$, hence a trivial shift to the square-lattice GKP qunaught state.

The effectiveness of the three-level transmon scheme is demonstrated in FIG. 7C. As indicated by the dashed line, despite the strong transmon decay and dephasing rates $\gamma_\downarrow = \Gamma_\phi = 1/(25 \text{ µs})$, the three-level transmon scheme nearly achieves as high GKP squeezing as in the case where the transmon is assumed to be noiseless (i.e., the solid line). In particular, while the two-level transmon scheme (dotted line in FIG. 7C) can only achieve a GKP squeezing of 10.4 dB at most, the three-level scheme can achieve a GKP squeezing of 11.8 dB choosing the target GKP squeezing to be 14 dB. Moreover, it can potentially realize a higher GKP squeezing by further increasing the target GKP squeezing.

Illustrative Computer System

Figure 8:
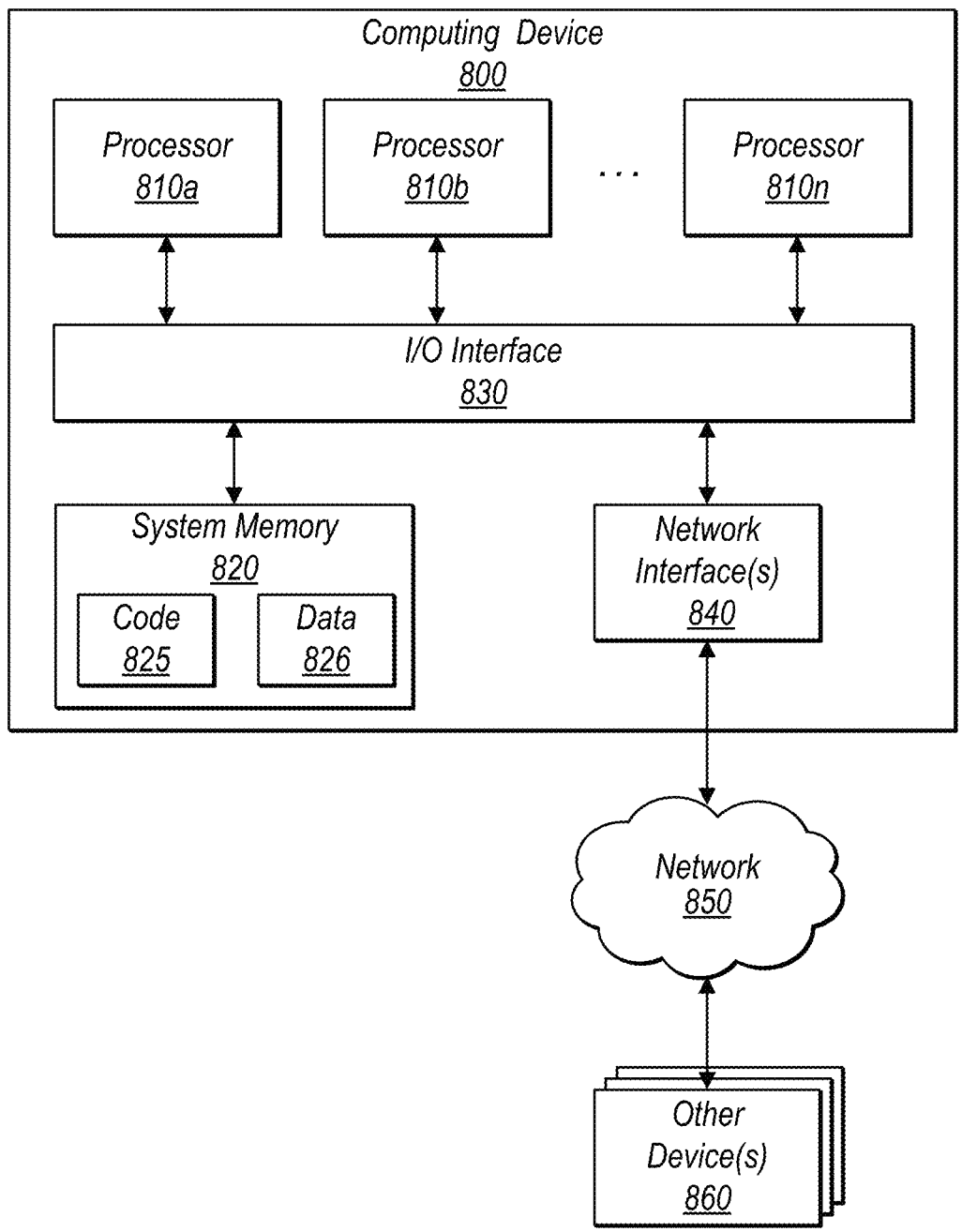
FIG. 8 is a block diagram illustrating an example computing device that may be used in at least some embodiments.

FIG. 8 is a block diagram illustrating an example computing device that may be used in at least some embodiments.

FIG. 8 illustrates such a general-purpose computing device 800 as may be used in any of the embodiments described herein. In the illustrated embodiment, computing device 800 includes one or more processors 810 coupled to a system memory 820 (which may comprise both non-volatile and volatile memory modules) via an input/output (I/O) interface 830. Computing device 800 further includes a network interface 840 coupled to I/O interface 830. Classical computing functions such as edge graphing of syndrome measurement and other non-quantum operations as described herein may be performed on a classical computer system, such as computing device 800.

In various embodiments, computing device 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. In some implementations, graphics processing units (GPUs) may be used instead of, or in addition to, conventional processors.

System memory 820 may be configured to store instructions and data accessible by processor(s) 810. In at least some embodiments, the system memory 820 may comprise both volatile and non-volatile portions; in other embodiments, only volatile memory may be used. In various embodiments, the volatile portion of system memory 820 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 820 as code 825 and data 826.

In some embodiments, I/O interface 830 may be configured to coordinate I/O traffic between processor 810, system memory 820, and any peripheral devices in the device, including network interface 840 or other peripheral interfaces such as various types of persistent and/or volatile storage devices. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other devices 860 attached to a network or networks 850, such as other computer systems or devices. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may represent one embodiment of a computer-accessible medium configured to store at least a subset of program instructions and data used for implementing the methods and apparatus discussed in the context of FIG. 1 through FIG. 7C. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 800 as system memory 820 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 840. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
one or more computing devices configured to decode a surface code comprising logical information, wherein to decode the surface code, the one or more computing devices are further configured to:
receive a syndrome measurement history for syndrome measurements of error-corrected Gottesman Kitaev Preskill (GKP) qubits of the surface code;
receive analog information or confidence values indicating respective levels of confidence in error corrections for the GKP qubits of the surface code, wherein the confidence values are determined based on the analog information, and wherein the analog information indicates relative amounts respective position operators ($\hat{q}$) or respective momentum operators ($\hat{p}$) of the GKP qubits were shifted relative to a decision boundary when performing error correction;
determine edges between syndrome measurements for respective ones of the GKP qubits of the surface code for, or across, one or more rounds of the syndrome measurements,
wherein the determined edges comprise:
space-time correlated edges; and
two-dimensional edges;
determine weightings for the edges, wherein the analog information or the confidence values are used to determine the weightings, wherein GKP qubits with analog information or confidence values indicating higher confidence in error correction for the respective GKP qubits are weighted more heavily than other respective GKP qubits for which the analog information or the confidence values indicate less confidence in error correction for the other respective GKP qubits; and
apply a minimum weight perfect matching (MWPM) to the weighted edges to decode the surface code, wherein:
said decoding the surface code extracts the logical information from the surface code; and
said applying the MWPM corrects one or more logical errors.

2. The system of claim 1,
wherein the determined weights for the edges, comprise weights for the two-dimensional edges which are determined based on confidence values or analog information for qubits associated with the respective two-dimensional edges or two-qubit gate failures associated with the respective two-dimensional edges.

3. The system of claim 2,
wherein the determined weights for the edges, comprise weights for the space-time correlated edges which are determined based on confidence values or analog information for two-qubit gate failures.

4. The system of claim 3,
wherein the determined weights for the edges, comprise weights for vertical edges which are determined based on confidence values or analog information for measurement errors or two-qubit gate failures.

5. The system of claim 1 wherein the weighted edges accounting for error correction confidence levels of the syndrome measurements result in a logical error probability of less than $10^{-7}$ for a surface code comprising 500 oscillators or less.

6. The system of claim 5, wherein squeezing applied to the GKP qubits is 11.5 decibels (dB) or more.

7. The system of claim 1, wherein the analog information or the confidence values are used to dynamically determine conditional probabilities used to determine the weightings, wherein the dynamically determined conditional probabilities are determined for each gate, idle, state-preparation, and measurement location at each time step of the one or more rounds of the syndrome measurements.

8. The system of claim 1, wherein the one or more computing devices are further configured to:
dynamically update the edge weights for each time step of the one or more rounds of the syndrome measurements.

9. A method, comprising:
receiving information for a surface code, wherein the information comprises:
a syndrome measurement history; and
analog information;
determining edges between syndrome measurements of the syndrome measurement history for respective ones of a plurality of Gottesman Kitaev Preskill (GKP) qubits of the surface code for, or across, one or more rounds of syndrome measurements,
wherein the determined edges comprise:
space-time correlated edges; and
two-dimensional edges;
determining weightings for the edges, wherein the analog information is used to determine the weightings, wherein GKP qubits with analog information indicating higher confidence in error correction for respective ones of the GKP qubits are weighted more heavily than other respective GKP qubits for which the analog information indicated less confidence; and
decoding the surface code using the determined weightings for the edges, wherein said decoding comprises:
extracting logical information from the syndrome measurement history for the surface code; and
correcting one or more logical errors.

10. The method of claim 9, wherein decoding the surface code comprises:
applying a minimum weight perfect matching (MWPM) to the weighted edges to decode the surface code.

11. The method of claim 9,
wherein the determined weights for the edges, comprise two-dimensional edges which are determined based on confidence values or analog information for qubits associated with the respective two-dimensional edge or two-qubit gate failures associated with the respective two-dimensional edge.

12. The method of claim 11, wherein the determined weights for the edges, comprise space-time correlated edges which are determined based on confidence values or analog information for two-qubit gate failures.

13. The method of claim 9, wherein:
the received analog information indicates respective levels of confidence in error corrections for the GKP qubits of the surface code, wherein confidence values are determined based on the analog information, and wherein the analog information indicates relative amounts respective position operators ($\hat{q}$) or respective momentum operators ($\hat{p}$) of the GKP qubits were shifted relative to a decision boundary when performing error correction; and
the received analog information or the determined confidence values are used to dynamically determine conditional probabilities used to determine the weightings.

14. The method of claim 13, further comprising:
dynamically updating the edge weights for each time step of the one or more rounds of the syndrome measurements.

15. The method of claim 14, wherein:
the received syndrome measurement history comprises syndrome measurements of error-corrected GKP qubits of the surface code; and
the dynamically determined conditional probabilities are determined for each gate, idle, state-preparation, and measurement location at each time step of the one or more rounds of the syndrome measurements.

16. The method of claim 9, further comprising:
generating a matrix comprising conditional probabilities computed dynamically for each qubit for each error syndrome measurement round.

17. The method of claim 16, wherein the matrix comprises:
conditional probabilities for X, Y, and Z type Pauli errors arising from fault locations of the qubits of the surface code.

18. The method of claim 17, wherein at least some of the idling qubits have more than one fault location in a given syndrome measurement round due to gate interactions.

19. One or more non-transitory computer-readable media storing program instructions, that when executed on or across one or more processors, cause the one or more processors to:
receive information for a surface code, wherein the information comprises:
a syndrome measurement history; and
analog information;
determine edges between syndrome measurements of the syndrome measurement history for respective ones of a plurality of Gottesman Kitaev Preskill (GKP) qubits of the surface code for, or across, one or more rounds of the syndrome measurements,
wherein the determined edges comprise:
space-time correlated edges; and
two-dimensional edges;
determine weightings for the edges, wherein the analog information is used to determine the weightings, wherein GKP qubits with analog information indicating higher confidence in error correction for respective ones of the GKP qubits are weighted more heavily than other respective GKP qubits for which the analog information indicated less confidence; and
decode the surface code using the determined weightings for the edges, wherein, to decode, the program instructions further cause the one or more processors to:
extract logical information from the syndrome measurement history for the surface code; and
correct one or more logical errors.

20. The one or more non-transitory computer-readable media of claim 19, wherein to decode the surface code using the determined weightings for the edges, the program instructions, when executed on or across the one or more processors, further cause the one or more processors to:
apply a minimum weight perfect matching (MWPM) to the weighted edges to decode the surface code.

* * * * *